US011533771B2

(12) United States Patent
Akiyoshi

(10) Patent No.: US 11,533,771 B2
(45) Date of Patent: Dec. 20, 2022

(54) COMMUNICATION SYSTEM, RADIO-ACCESS APPARATUS, RADIO COMMUNICATION TERMINAL, AND CONTROL METHOD THEREFOR

(71) Applicant: NEC CORPORATION, Tokyo (JP)

(72) Inventor: Ippei Akiyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 396 days.

(21) Appl. No.: 16/334,398

(22) PCT Filed: Sep. 27, 2017

(86) PCT No.: PCT/JP2017/034991
§ 371 (c)(1),
(2) Date: Mar. 19, 2019

(87) PCT Pub. No.: WO2018/062286
PCT Pub. Date: Apr. 5, 2018

(65) Prior Publication Data
US 2021/0298104 A1  Sep. 23, 2021

(30) Foreign Application Priority Data
Sep. 28, 2016  (JP) .............................. JP2016-189103

(51) Int. Cl.
*H04W 76/16*  (2018.01)
*H04W 40/12*  (2009.01)
(Continued)

(52) U.S. Cl.
CPC ........... *H04W 76/16* (2018.02); *H04W 40/12* (2013.01); *H04W 84/12* (2013.01); *H04W 92/20* (2013.01)

(58) Field of Classification Search
CPC ...... H04W 76/16; H04W 84/12; H04W 92/20
(Continued)

(56) References Cited

U.S. PATENT DOCUMENTS 9,900,925 B2    2/2018   Fujishiro et al.
2016/0212790 A1  7/2016  Fujishiro et al.
(Continued)

FOREIGN PATENT DOCUMENTS

CN    105191428 A    12/2015
CN    105519182 A    4/2016
(Continued)

OTHER PUBLICATIONS

Ericsson, "Signalling procedures for dual connectivity", 3GPP TSG-RAN WG2 Meeting #84, 7.2.2.1, Nov. 11-15, 2013, Tdoc R2-134219 (9 pages total).
(Continued)

*Primary Examiner* — Faisal Choudhury
(74) *Attorney, Agent, or Firm* — Sughrue Mion, PLLC

(57) ABSTRACT

A communication system includes a first radio access apparatus, a second radio access apparatus, and a radio terminal that is enabled to simultaneously communicate with the first radio access apparatus and the second radio access apparatus. The communication system acquires service characteristic information that indicates a characteristic of a service provided to the radio terminal and determines a type of a communication path for downlink user data used for provision of the service to the radio terminal, from among a plurality of types of communication paths, based on the service characteristic information.

10 Claims, 27 Drawing Sheets

(51) Int. Cl.
*H04W 84/12* (2009.01)
*H04W 92/20* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2018/0007552 | A1* | 1/2018 | Bae | H04W 12/041 |
| 2018/0035343 | A1* | 2/2018 | Godin | H04W 36/28 |
| 2018/0049214 | A1* | 2/2018 | Kubota | H04W 36/04 |
| 2018/0083688 | A1* | 3/2018 | Agiwal | H04W 48/16 |
| 2018/0167994 | A1 | 6/2018 | Fujishiro et al. | |
| 2019/0342148 | A1* | 11/2019 | Hong | H04W 28/0252 |

FOREIGN PATENT DOCUMENTS

| | | |
|---|---|---|
| CN | 105594251 A | 5/2016 |
| CN | 105874863 A | 8/2016 |
| EP | 2836028 A1 | 2/2015 |
| EP | 2836047 A1 | 2/2015 |
| EP | 2 922 344 A1 | 9/2015 |
| JP | 2015-185937 A | 10/2015 |
| WO | 2015/098951 A1 | 7/2015 |
| WO | 2016/060483 A1 | 4/2016 |

OTHER PUBLICATIONS

ZTE, "Further discussion on the inter-MeNB handover enhancement in dual connectivity", 3GPP TSG-RAN WG3 Meeting #87bis, R3-150627, 20.3, Apr. 20-24, 2015 (4 pages total).

Extended European Search Report dated Jul. 23, 2019 in European Application No. 17856235.1.
"LTE; Evolved Universal Terrestrial Radio Access (E-UTRA) and Evolved Universal Terrestrial Radio-Access Network (E-UTRAN); Overall description; Stage 2 (3GPP TS 36.300 v13.4.0 Release 13)", ETSI TS 136 300 V13.4.0, Aug. 2016, 322 pages.
"3rd Generation Partnership Project; Technical Specification Group Services and System Aspects; Feasibility Study on New Services and Markets Technology Enablers—Critical Communications; Stage 1 (Release 14)", 3GPP TR 22.862 V14.0.0, Jun. 2016, pp. 1-32.
"3rd Generation Partnership Project; Technical Specification Group Radio-Access Network; Study on New Radio Access Technology; Radio Access Architecture and Interfaces (Release 14)", 3GPP TR 38.801 V0.2.0, Jun. 2016, pp. 1-20.
"SCG split bearer for NR", ZTE, 3GPP TSG RAN WG3 Meeting #93, R3-161629, Aug. 22-26, 2016, Gothenburg, Sweden, 4 pages.
"3rd Generation Partnership Project; Technical Specification Group Services and System Aspects; Policy and charging control architecture (Release 14)", 3GPP TS 23.203 V14.0.0, Jun. 2016, pp. 1-245.
"QCI values for Public Safety services", Vodafone, 3GPP TSG SA Meeting #65, Sep. 15-17, 2014, Edinburgh, UK, pp. 1-5.
"Corrections to the coexistence of LWA, RCLWI and DC, LWIP, RAN assisted WLAN interworking", 3GPP TSG-RAN2 Meeting 95, Huawei, HiSilicon, Intel Corporation, R2-165947, Aug. 22-26, 2016, Gothenburg, Sweden, 4 pages.
International Search Report for PCT/JP2017/034991 dated Nov. 21, 2017 (PCT/ISA/210).
Chinese Office Action for CN Application No. 201780058955.4 dated Aug. 22, 2022 with English Translation.
Samsung, "On the need of new DRB types in NR". 3GPP TSG-RAN WG2 Meeting #94, R2-163749, May 13, 2016.
Ericsson, "A common user plane architecture for dual connectivity", 3GPP TSG-RAN WG2 #84. R2-134224, Nov. 2, 2013.

* cited by examiner

| SERVICE TYPE | DESIRED BAND | ALLOWABLE DELAY | DESIRED RELIABILITY |
|---|---|---|---|
| SERVICE A | LARGE | SMALL | LARGE |
| SERVICE B | SMALL | LARGE | SMALL |
| SERVICE C | LARGE | MEDIUM | MEDIUM |
| ⋮ | ⋮ | ⋮ | ⋮ |

FIG. 25

| PATH ENDPOINT 1 | PATH ENDPOINT 2 | AVAILABLE BAND | DELAY | RELIABILITY |
|---|---|---|---|---|
| FIRST RADIO ACCESS APPARATUS 31 | SECOND CORE NETWORK NODE 20 | LARGE | SMALL | LARGE |
| SECOND RADIO ACCESS APPARATUS 32 | SECOND CORE NETWORK NODE 20 | SMALL | LARGE | SMALL |
| FIRST RADIO ACCESS APPARATUS 31 | SECOND RADIO ACCESS APPARATUS 32 | LARGE | SMALL | LARGE |
| ... | ... | ... | ... | ... |

406 ly, the UE 140 is connected to
COMMUNICATION SYSTEM, RADIO-ACCESS APPARATUS, RADIO COMMUNICATION TERMINAL, AND CONTROL METHOD THEREFOR

FIELD

Reference to Related Application

The present disclosure is based upon and claims the benefit of the priority of Japanese patent application No. 2016-189103, filed on Sep. 28, 2016, the disclosure of which is incorporated herein in its entirety by reference thereto.

The present invention relates to a communication system, a radio access apparatus, a radio communication terminal, and a control method therefor.

BACKGROUND

NPL 1, which is a 3GPP (3rd Generation Partnership Project) standard specification, discloses a communication system illustrated in FIG. 1 as an example of a conventional communication system. The communication system in FIG. 1 includes an MME (Mobility Management Entity) 110, an S/P-GW (Serving/PDN (Packet Data Network) Gateway) 120, an MeNB (Master eNodeB (evolved NodeB)) 131, an SeNB (Secondary eNodeB) 132, and a UE (User Equipment) 140.

The MME 110 is a core network node that manages mobility (e.g., Handover) of the UE 140 and a data communication transmission path referred to as a bearer (e.g., an EPS (Evolved Packet System) bearer, an E-RAB (EUTRAN (Evolved Universal Terrestrial Radio-access network) Radio Access Bearer)). The MME 110 is connected to an eNB (the MeNB) via an S1-MME interface and terminates an S1-MME bearer.

The S/P-GW 120 is a core network node that terminates several bearers and serves as a gateway when the UE 140 performs data communication. More accurately, in LTE (Long Term Evolution) and LTE-Advanced (Pro) of the 3GPP, two kinds, which are an S-GW (a Serving gateway) and a P-GW (a PDN gateway), are defined. However, in FIG. 1, for ease of description, an S-GW and a P-GW will be described as a single core network node, which is the S/P-GW 120. An S-GW terminates an S1-U bearer, an S5/S8 bearer, and an E-RAB. In addition, a P-GW terminates an S5/S8 bearer and an EPS bearer.

The MeNB 131 is a main radio access apparatus used when the UE 140 connects to a radio access network. The MeNB 131 communicates control signal(s) (e.g., Radio Resource Control (RRC) Signaling) and user data with the UE 140. More specifically, the MeNB 131 provides the UE 140 with an SRB (a Signaling Radio Bearer) as a Control Plane (C-Plane) in a cell (i.e., a Primary Cell (PCell)) managed by the MeNB 131. In addition, the MeNB 131 provides the UE 140 with a DRB (a Data Radio Bearer) as a User Plane (U-Plane) in the cell (i.e., PCell) or different cell(s) (i.e., a Secondary Cell (SCell(s))) managed by the MeNB 131. The DRB is mapped with the EPS bearer or the E-RAB on a one-to-one basis.

The SeNB 132 is an additional radio access apparatus used when the UE 140 is connected to the radio access network. The SeNB 132 communicates data packets with the UE 140, as needed. More specifically, the SeNB 132 provides the UE 140 with the DRB (the Data Radio Bearer) as a User Plane (U-Plane) in a cell (i.e., a Primary Secondary Cell (PSCell) or a SCell) managed by the SeNB 132.

The MeNB 131 and the SeNB 132 are connected to each other via an X2 interface.

The UE 140 is a radio communication terminal (radio terminal) used when a user performs data communication via a network. More specifically, the UE 140 is connected to a radio access apparatus(s) (i.e., eNB (MeNB, SeNB)) via an Uu interface.

In the communication system in FIG. 1, the UE 140 can establish an RRC (Radio Resource Control) Connection with the MeNB 131 via the SRB and can simultaneously communicate with the MeNB 131 and the SeNB 132 by using radio resources provided in a cell group (a Master Cell Group (MCG)) managed by the MeNB 131 and a cell group (Secondary Cell Group (SCG)) managed by the Secondary eNB (SeNB). Namely, the UE 140 in an RRC Connected state are configured with the MCG and the SCG, and then the UE 140 can perform Dual Connectivity (DC), which is a technology for aggregating the MCG and the SCG. Since a plurality of cells of different eNBs are aggregated, this DC is also referred to as Inter-eNB Carrier Aggregation (CA).

FIG. 2 discloses a radio protocol architecture of the DC of the 3GPP. As illustrated in FIG. 2, the DC of the 3GPP provides an MCG bearer, an SCG bearer, and a Split bearer. Improvement of a throughput of the UE 140 can be expected by selectively using these three types of bearers. The MCG bearer is a type of a bearer which goes through only the MeNB 131. In the MCG bearer, a corresponding S1-U bearer is terminated in the MeNB 131. The SeNB 132 is not involved in U-Plane data transmission over the Uu interface for this bearer type. The SCG bearer is a type of a bearer which goes through only the SeNB 132. In the SCG bearer, the SeNB 132 is logically connected to the S-GW directly via an S1-U bearer. The MeNB 131 is not involved in U-Plane data transmission over the Uu interface for this bearer type. The Split bearer is a bearer in which the MeNB 131 firstly receives downlink traffic and the received traffic is separated and forwarded to the MeNB 131 and the SeNB 132. More specifically, in the Split bearer, the S1-U bearer between the MeNB 131 and the S-GW is terminated by the MeNB 131. Furthermore, PDCP (Packet Data Convergence Protocol) data is forwarded between the MeNB 131 and the SeNB 132 via an X2 interface. Both of the MeNB 131 and the SeNB 132 are involved in U-Plane data transmission over the Uu interface for this bearer type. In the DC, by selectively using an optimum bearer type in view of a radio wave environment (e.g., radio quality) and the like between the UE 140 and each eNB, improvement of a communication speed is expected, as compared with a case in which only a single bearer type is available.

In addition, as described in NPL 1, the 3GPP defines LTE-WLAN Aggregation (LWA) that enables the UE 140 in an RRC Connected state to simultaneously use LTE and WLAN (Wireless Local Access Network) radio resources. FIG. 3 illustrates an example of an LWA communication system. The communication system in FIG. 3 differs from the communication system in FIG. 1 in that the communication system in FIG. 3 includes an eNB 231 and a WT (a WLAN Termination) 232 in place of the MeNB 131 and the SeNB 132. The other nodes may be the same as those in the communication system in FIG. 1.

The eNB 231 is a main radio access apparatus used when the UE 140 connects to a network, as in the MeNB 131 and the SeNB 132. The eNB 231 communicates a control signal (e.g., RRC Signaling) and data packets with the UE 140.

The WT 232 includes a WLAN processing function (an entity) and is a logical node that terminates an Xw interface with the eNB 231 on the WLAN side. The WT 232 may be co-located with an access point (i.e., WLANAP) used when the UE 140 supporting WLAN radio access connects to a WLAN network or may be arranged alone (standalone).

Alternatively, the WLAN processing function (entity) in the WT 232 may be co-located in the eNB 231. In this case, the WT 232 is not an essential constituent element.

The LWA of the 3GPP provides an LTE bearer, a Split LWA bearer, and a Switched LWA bearer as illustrated in FIGS. 4A and 4B. By selectively using these three types of bearers, improvement of a throughput of the UE 140 can be expected. The LTE bearer is a bearer type which goes through the eNB 231 for using radio resources of (LTE-side) of the eNB 231 only. The Split LWA bearer is a bearer type which goes through both of the eNB 231 and the WLAN for using radio resources of both of (the LTE side) of the eNB 231 and the WLAN. While the Switched LWA bearer uses a radio resource of the WLAN only, the Switched LWA bearer is a bearer type which goes through both of the eNB 231 and WLAN.

The Split LWA bearer and the Switched LWA bearer may collectively be referred to as an LWA bearer. In this case, the LWA bearer can be considered as a bearer type which goes through both of the eNB 231 and WLAN for using resources of both of (an LTE side) of the eNB 231 and the WLAN, and use of the radio resource of (an LTE side) of the eNB 231 is not essential.

As in the DC, in the case of the LWA, an optimum bearer type is selectively used in view of a radio wave environment (e.g., radio quality) or the like between the UE 140 and the eNB and WT. Thus, better improvement of a communication speed may be expected, as compared with a case in which only a single bearer type is available.

In addition, the 3GPP has started standardization of the fifth generation mobile communication system (5G) as 3GPP Release 14 (NPL 3). It is assumed that 5G will be realized by a combination of innovative enhancement and evolution based on continuous enhancement/evolution of LTE and LTE-Advanced (Pro) and introduction of a new 5G air interface (new Radio Access Technology (RAT)). The new RAT supports, for example, a frequency band higher than a frequency band (e.g., 6 GHz or less) to which the continuous evolution of LTE/LTE-Advanced is directed. For example, the new RAT supports a centimeter wave band of 10 GHz or more and a millimeter wave band of 30 GHz or more.

In the present description, the fifth generation mobile communication system is also referred to as a Next Generation (NextGen) System (NG System). A new RAT for the NG System is referred to as New Radio (NR), 5G RAT, or NG RAT. A new radio access network (RAN) and a new core network for the NG System are referred to as a New RAN (or an NG RAN) and a NextGen Core (an NG Core), respectively. A radio terminal (User Equipment (UE)) connected to the NG System is referred to as a NextGen UE (NG UE), and a base station (nodeB) included in the New RAN is referred to as an NR NB (nodeB), an NG NB, an NG BS (Base Station), or a gNB (next Generation nodeB).

FIG. 5 illustrates an example of a communication system of the NG System. The communication system in FIG. 5 includes an eEPC (enhanced Evolved Packet Core) node 200, a NextGen Core node 300, an eLTE (enhanced LTE) eNB 331, an NR NB 332, and an NG UE 240.

The term "enhanced" means enhancement and evolution of LTE and LTE-Advanced (Pro) made so that an LTE system realizes interworking with an NG System.

For simplicity, the eEPC node 200 is illustrated as a node that includes an MME, an S-GW, and a P-GW. However, the MME, the S-GW, and the P-GW included in the eEPC node 200 may be located separately.

The NG Core node 300 is a core network node in the NG System and performs processing corresponding to an EPC (e.g. the MME, the S-GW, and the P-GW). In the NG Core node 300, the node corresponding to the MME of the EPC may be referred to as an NG Core CPF (C-Plane Function) node or an MMF (Mobility Management Function) node. Likewise, in the NG Core node 300, the node corresponding to the S-GW and the P-GW of EPC may be referred to as an NG Core UPF (U-Plane Function) node.

The eLTE eNB 331 is a node corresponding to the eNB 231 and has been enhanced to realize interworking with the NG System. The eLTE eNB 331 may be connected to the eEPC node 200 via S1-U and S1-MME interfaces and connected to the NG Core node 300 via NG2 and NG3 interfaces.

The NR NB 332 is a radio base station in the NG System and provides New Radio to the NG UE 240. The NR NB 332 may be connected to the NG Core node 300 via NG2 and NG3 interfaces and connected to the eEPC node 200 via S1-U and S1-MME interfaces.

In addition, the eLTE eNB 331 and the NR NB 332 may be connected to each other via an NX2 or Xn interface.

The NG UE 240 is a node equivalent to the UE 140 and has a capability of communicating with the NR NB 332, etc., via New Radio, in addition to the LTE communication capability.

Regarding the NG System, a method in which the NG System works alone (i.e., standalone) and a method in which the NG System performs interworking with the eLTE have been proposed. Among these methods, the method in which the NG System performs interworking with the eLTE is currently referred to as LTE-NG Tight Interworking. Regarding the LTE-NG Tight Interworking, a DC (Dual Connectivity)-like technology after LTE-Advanced Rel.12 is expected to be adopted, and this DC-like technology may be referred to as "Multi Connectivity". The Multi Connectivity may be considered as an operation mode in which a UE having multiple transceivers is configured to utilise radio resources provided by multiple schedulers located in multiple RAN nodes connected via non-ideal backhauls each other.

Namely, the NG UE 240 can aggregate at least one cell managed by the eLTE eNB 331 as the MeNB and at least one cell managed by the NR NB 332 as the SeNB.

Thus, bearers such as an MCG bearer, an SCG bearer, and a Split bearer in the DC could also be provided in the NG System. In the present description, an NG System bearer corresponding to the Split bearer of the DC after LTE-Advanced Rel.12 will be referred to as an MCG Split bearer. The other bearers will be referred to as the MCG bearer and the SCG bearer, as in the DC. In addition, as illustrated in NPL 4, in the NG System, "SCG Split bearer" may be defined as a new Split bearer. Namely, in the case of the SCG Split bearer, as illustrated in FIG. 6, an S1-U/NG3-U bearer with an S-GW or an NG Core node (e.g., an NG Core UPF node) corresponding to the S-GW is terminated in the NR NB 332 (Secondary NR NB) as an SeNB. And then, PDCP (Packet Data Convergence Protocol) data is forwarded to the eLTE eNB 331 (eLTE MeNB) as the MeNB via the NX2 or Xn interface. Both of the eLTE eNB 331 and the NR NB 332 are involved in a user plane data transmission over a Uu interface for this bearer type.

The above LWA and LTE-NG Tight Interworking are also referred to as Inter-RAT (Carrier) Aggregation, from a view point that carrier aggregation between different RATs is performed.

When each communication system described above is implemented, there is a case in which backhauls 50 to 54 as illustrated in FIG. 7 are arranged among a first core network node 10 such as an MME, a second core network node 20 such as an S/P-GW, a first radio access apparatus 31 such as an MeNB, and a second radio access apparatus 32 such as an SeNB. Generally, these backhauls are configured by connecting a plurality of subnetworks called "domains". A domain is a unit for managing a network and is configured in various ways. For example, a domain is configured based on a region, a kind of a communication medium such as an optical fiber or a microwave, or a vendor providing a communication apparatus included in a network. For example, as illustrated in FIG. 7, a communication system may be divided by backhauls (subnetworks) in a Core Domain, an Aggregation Domain, and an Access Domain. A communication system may include a Metro Domain backhaul (subnetwork) not illustrated. Alternatively, a domain may be configured by a plurality of subdomains.

Various communication technologies, e.g., a wired communication using an optical fiber and a wireless communications using a microwave or a millimeter wave, are used for backhauls. One of these communication technologies has a characteristic, different to each other, about a communication capacity, a delay, reliability, etc. For example, in many cases, a wireless communication generally has a smaller communication capacity than that of a wired communication. In addition, a wireless communication represents a different characteristic, depending on a frequency used. For example, a communication quality of a wireless communication deteriorates more easily due to weather than that of a wired communication, and an impact of the weather differs depending on a frequency band. In addition, a license may be needed for use of a wireless communication, depending on a frequency band. A frequency band that does not require a license for use of a wireless communication can be used more easily than a frequency band that requires a license. However, there is a risk that a frequency band that does not require a license is potentially more susceptible to interference.

As described above, if a communication path (e.g., a bearer) type used for interworking (e.g., DC, LWA, or LTE-NG Tight Interworking) between different radio access apparatuses is selected without considering a characteristic of a backhaul formed when networks having different characteristics coexist, a backhaul that does not satisfy a requirement of a service provided to a radio communication terminal may possibly be used. For example, as described in NPL 2, a future communication system (e.g., the NG system) is expected to accommodate a service having extremely biased communication requirement, such as a delay of 100 msec (milliseconds) or less in RTT (Round Trip Time), a reliability of 99.999%, and the like. To satisfy these extreme requirements, the backhaul characteristic need to be taken into consideration.

In this aspect, PTLs 1 and 2 disclose a technology of selecting a user plane structure (a bearer type) based on a network status in a mobile communication system that performs Dual Connectivity. The network status includes a communication status or a maximum transmission rate between an MeNB and an SeNB, capabilities of the MeNB and the SeNB, a capability of a backhaul line between the MeNB and the SeNB, a communication status between the MeNB and an MME/S-GW, a load on the EPC, a load on the SeNB, and a load on a router.

CITATION LIST

Patent Literature

PTL 1: International Publication No. 2015/098951
PTL 2: Japanese Patent Kokai Publication No. JP2015-185937A Non Patent Literature NPL 1: 3GPP TS36.300 v13.4.0 (2016-06), "3rd Generation Partnership Project; Technical Specification Group Radio-access network; Evolved Universal Terrestrial Radio Access (E-UTRA) and Evolved Universal Terrestrial Radio-access network (E-UTRAN); Overall description; Stage 2 (Release 13)", June 2016
NPL 2: 3GPP TR 22.862 V14.0.0 (2016-06), "3rd Generation Partnership Project; Technical Specification Group Services and System Aspects; Feasibility Study on New Services and Markets Technology Enablers—Critical Communications; Stage 1 (Release 14)", June 2016
NPL 3: 3GPP TR 38.801 V0.2.0 (2016-06), "3rd Generation Partnership Project; Technical Specification Group Radio-access network; Study on New Radio Access Technology; Radio Access Architecture and Interfaces (Release 14)", June 2016
NPL 4: 3GPP TSG RAN WG3 Meeting #93, R3-161629, Gothenburg, Sweden, Aug. 22-26, 2016
NPL 5: 3GPP TS 23.203 V14.0.0 (2016-06), "3rd Generation Partnership Project; Technical Specification Group Services and System Aspects; Policy and charging control architecture (Release 14)

SUMMARY

While the above described communication system and the communication systems disclosed in PTLs 1 and 2 consider a network status when selecting a bearer type used for interworking between different radio access apparatuses, the systems do not consider a characteristic of a service provided to a radio terminal. Thus, the network status corresponding to the selected bearer type could be excessive or insufficient with respect to a service requirement of the service provided to the radio terminal. Namely, a resource utilization efficiency of the communication system as a whole could be deteriorated.

The present disclosure has been made in view of the above circumstances, and it is an object of the present disclosure to provide a communication system selecting a communication path that can contribute to satisfy a service requirement of a service provided to a radio terminal. It should be noted that this object is only one of a plurality of objects achieved by a plurality of example embodiments disclosed by the present description. Objects, problems, and new features may become apparent from the present description or the accompanying drawings.

In a first aspect, there is disclosed a communication system, which includes a first radio access apparatus, a second radio access apparatus, and a radio terminal that is enabled to simultaneously communicate with the first radio access apparatus and the second radio access apparatus and in which user data can be transmitted to the radio terminal by using one of a plurality of types of communication paths which go through at least one of the first radio access apparatus and the second radio access apparatus. The communication system includes a means that acquires service characteristic information that indicates a characteristic of a service provided to the radio terminal, and a means that determines a type of a communication path for downlink user data used for provision of the service to the radio terminal from among the plurality types of communication paths, based on the service characteristic information. The plurality of communication path types include at least two out of: a first communication path that goes through only the first radio access apparatus; a second communication path that goes through only the second radio access apparatus; a third communication path in which a part of traffic of downlink user data that has arrived at the first radio access apparatus goes through the second radio access apparatus and a remaining part of the traffic goes through the first radio access apparatus; a fourth communication path in which traffic of downlink user data that has arrived at the first radio access apparatus goes through only the second radio access apparatus; a fifth communication path in which a part of traffic of downlink user data that has arrived at the second radio access apparatus goes through the first radio access apparatus and a remaining part of the traffic goes through the second radio access apparatus; and a sixth communication path in which traffic of downlink user data that has arrived at the second radio access apparatus goes through only the first radio access apparatus.

In a second aspect, there is disclosed a first radio access apparatus, which supports a plurality of types of communication paths which go through at least one of the first radio access apparatus and a second radio access apparatus. and which communicates with a radio terminal that is enabled to simultaneously communicate with the first radio access apparatus and the second radio access apparatus. The first radio access apparatus includes: a means that acquires service characteristic information that indicates a characteristic of a service provided to the radio terminal; and a means that determines a type of a communication path for downlink user data used for provision of the service to the radio terminal from among the plurality types of communication paths, based on the service characteristic information. The plurality of communication path types include at least two out of: a first communication path that goes through only the first radio access apparatus; a second communication path that goes through only the second radio access apparatus; a third communication path in which a part of traffic of downlink user data that has arrived at the first radio access apparatus goes through the second radio access apparatus and a remaining part of the traffic goes through the first radio access apparatus; a fourth communication path in which traffic of downlink user data that has arrived at the first radio access apparatus goes through only the second radio access apparatus; a fifth communication path in which a part of traffic of downlink user data that has arrived at the second radio access apparatus goes through the first radio access apparatus and a remaining part of the traffic goes through the second radio access apparatus; and a sixth communication path in which traffic of downlink user data that has arrived at the second radio access apparatus goes through only the first radio access apparatus. There is provided, as the first radio access apparatus, a master node operating a Master Cell Group (MCG) for dual connectivity using Long Term Evolution (LTE) and New Radio (NR), the master node comprising:

an Xn interface connected with a secondary node operating a Secondary Cell Group (SCG); and
a processor configured to:
send, to the secondary node via the Xn interface, a secondary node addition request message that includes bearer option related information indicating that a bearer used for the dual connectivity is into which either a master node terminated bearer or a secondary node terminated bearer is set, wherein
the bearer option related information included in the secondary node addition request message is determined based on a network slice that is provided for a User Equipment (UE) performing the dual connectivity, wherein
the master node terminated bearer is a bearer whose a user plane connection to a 5G core network entity is terminated in the master node and the master node terminated bearer is:
a first bearer whose transport of a user plane data for the UE involves the MCG only;
a second bearer whose transport of the user plane data for the UE involves the SCG only; or
a third bearer whose transport of the user plane data for the UE involves both the MCG and the SCG, wherein
the secondary node terminated bearer is a bearer whose the user plane connection to the 5G core network entity is terminated in the secondary node and the secondary node terminated bearer is:
a forth bearer whose transport of the user plane data for the UE involves the MCG only;
a fifth bearer whose transport of the user plane data for the UE involves the SCG only; or
a sixth bearer whose transport of the user plane data for the UE involves both the MCG and the SCG.

In a third aspect, there is disclosed a radio terminal, configured to be able to simultaneously communicate with a first radio access apparatus and a second radio access apparatus. The radio terminal includes: a means that receives control information including a determined type of a communication path type from the first radio access apparatus or the second radio access apparatus that has determined a type of a communication path for downlink user data used for provision of a service to the radio terminal from among a plurality of types of communication paths which go through at least one of the first radio access apparatus and the second radio access apparatus, based on service characteristic information that indicates a characteristic of the service provided to the radio terminal; and
a means that receives the downlink user data from at least one of the first radio access apparatus and the second radio access apparatus in a communication path corresponding to the communication path type included in the control information. The plurality of communication path types includes at least two out of: a first communication path that goes through only the first radio access apparatus; a second communication path that goes through only the second radio access apparatus; a third communication path in which a part of traffic of downlink user data that has arrived at the first radio access apparatus goes through the second radio access apparatus and a remaining part of the traffic goes through the first radio access apparatus; a fourth communication path in which traffic of downlink user data that has arrived at the first radio access apparatus goes through only the second radio access apparatus; a fifth communication path in which a part of traffic of downlink user data that has arrived at the second radio access apparatus goes through the first radio access apparatus and a remaining part of the traffic goes through the second radio access apparatus; and a sixth communication path in which traffic of downlink user data that has arrived at the second radio access apparatus goes through only the first radio access apparatus.

In a fourth aspect, there is disclosed a control method of a first radio access apparatus, which supports a plurality of types of communication paths which go through at least one of the first radio access apparatus and a second radio access apparatus and which communicates with a radio terminal that is enabled to simultaneously communicate with the first radio access apparatus and the second radio access apparatus. The control method of the first radio access apparatus includes:

acquiring service characteristic information that indicates a characteristic of a service provided to the radio terminal; and determining a type of a communication path for downlink user data used for provision of the service to the radio terminal from among the plurality types of communication paths, based on the service characteristic information. The plurality of communication path types includes at least two out of: a first communication path that goes through only the first radio access apparatus; a second communication path that goes through only the second radio access apparatus; a third communication path in which a part of traffic of downlink user data that has arrived at the first radio access apparatus goes through the second radio access apparatus and a remaining part of the traffic goes through the first radio access apparatus; a fourth communication path in which traffic of downlink user data that has arrived at the first radio access apparatus goes through only the second radio access apparatus; a fifth communication path in which a part of traffic of downlink user data that has arrived at the second radio access apparatus goes through the first radio access apparatus and a remaining part of the traffic goes through the second radio access apparatus; and a sixth communication path in which traffic of downlink user data that has arrived at the second radio access apparatus goes through only the first radio access apparatus.

In a fifth aspect, there is disclosed a control method of a radio terminal configured to be able to simultaneously communicate with a first radio access apparatus and a second radio access apparatus. The control method of the radio terminal includes:

receiving control information including a determined type of a communication path type from the first radio access apparatus or the second radio access apparatus that has determined a type of a communication path for downlink user data used for provision of a service to the radio terminal from among a plurality of types of communication paths which go through at least one of the first radio access apparatus and the second radio access apparatus, based on service characteristic information that indicates a characteristic of the service provided to the radio terminal; and receiving the downlink user data from at least one of the first radio access apparatus and the second radio access apparatus in a communication path corresponding to the communication path type included in the control information. The plurality of communication path types includes at least two out of: a first communication path that goes through only the first radio access apparatus; a second communication path that goes through only the second radio access apparatus; a third communication path in which a part of traffic of downlink user data that has arrived at the first radio access apparatus goes through the second radio access apparatus and a remaining part of the traffic goes through the first radio access apparatus; a fourth communication path in which traffic of downlink user data that has arrived at the first radio access apparatus goes through only the second radio access apparatus; a fifth communication path in which a part of traffic of downlink user data that has arrived at the second radio access apparatus goes through the first radio access apparatus and a remaining part of the traffic goes through the second radio access apparatus; and a sixth communication path in which traffic of downlink user data that has arrived at the second radio access apparatus goes through only the first radio access apparatus.

The present invention enables selection of a communication path that can contribute to satisfy the service requirements of a service provided to a radio terminal.

BRIEF DESCRIPTION OF THE DRAWINGS

FIG. 25 is a diagram illustrating an example of a path characteristics database according to a plurality of example embodiments.

DETAILED DESCRIPTION

Hereinafter, embodiments of the present disclosure will be described in detail with reference to drawings. In these drawings, the same or corresponding elements are denoted by the same reference signs, and redundant description thereof will be omitted unless further clarification of the description thereof is needed.

The following describes several embodiments that use LTE as a main object to which the embodiments are applied. However, other than LTE, these embodiments may also be applied to other mobile communication networks or systems such as 3GPP UMTS (Universal Mobile Telecommunications System), 3GPP NG System (5G communication system), 3GPP2 CDMA (Code Division Multiple Access) 2000 system (1×RTT (Single-Carrier Radio Transmission Technology), HRPD (High Rate Packet Data)), Global System for Mobile communication (GSM (registered trademark))/General packet radio service (GPRS) system, and WiMAX (Worldwide Interoperability for Microwave Access) system.

Following embodiments can be implemented independently or in combination as needed. These embodiments have new features different from each other. Thus, each of these embodiments can achieve a different object or can solve a different problem. Namely, these embodiments can provide respectively advantageous effects different to each other.

First Embodiment

[Description of Architecture]

Figure 7:
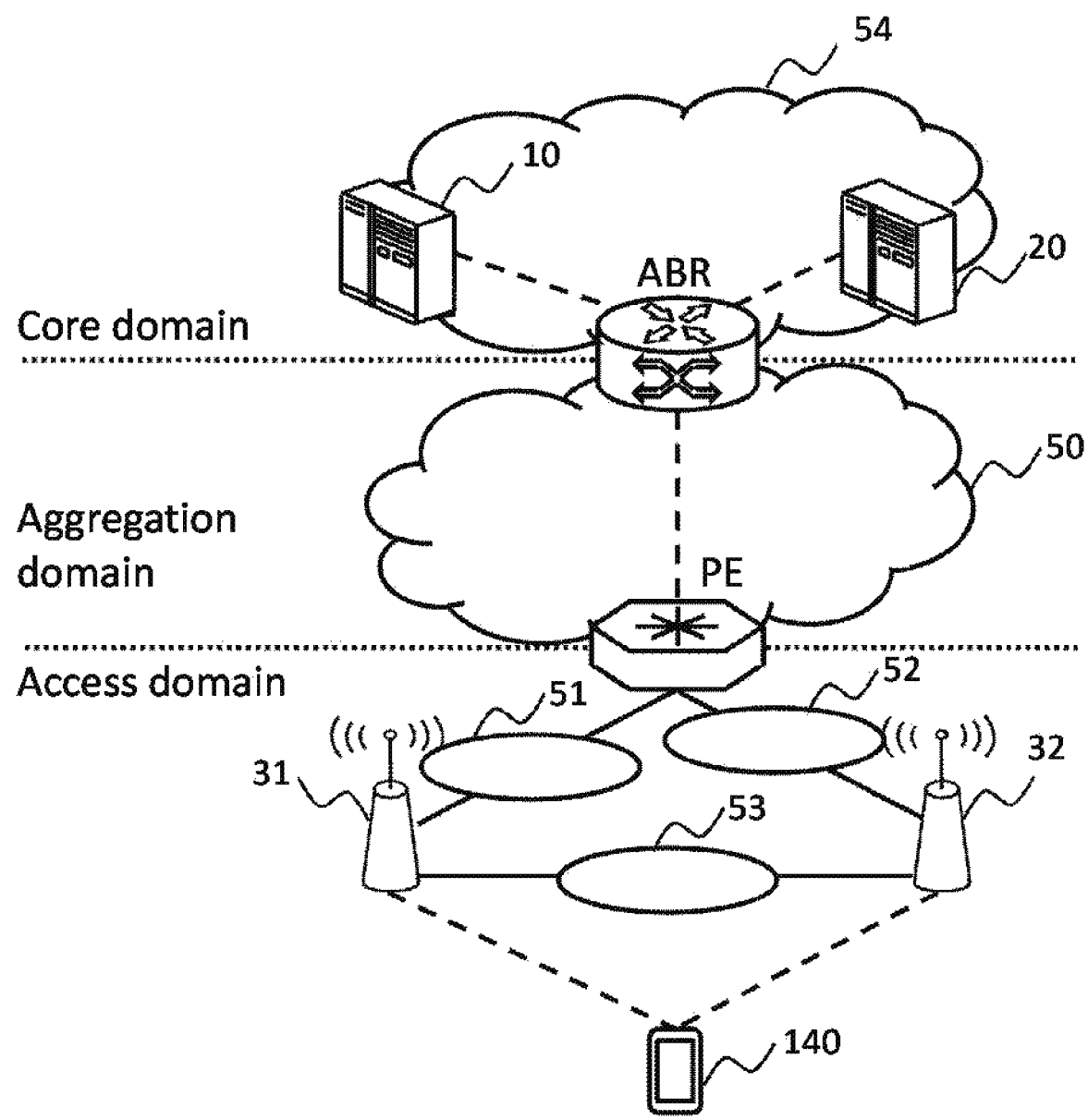
FIG. 7 is a diagram illustrating several communication system configuration examples in view of backhauls.
Figure 8:
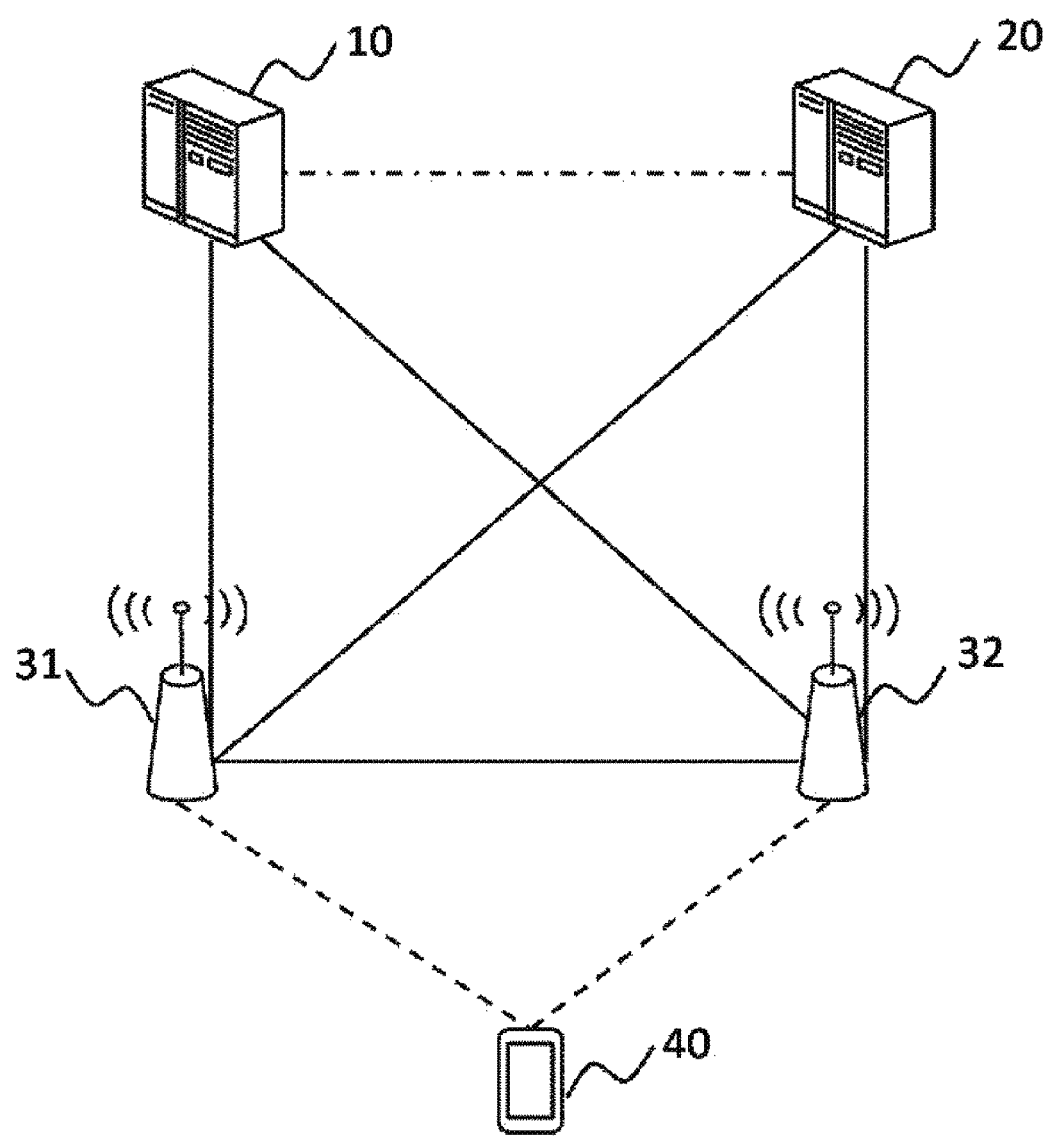
FIG. 8 is a diagram illustrating a configuration example of a communication system according to a first example embodiment.

FIG. 8 is a diagram illustrating example of a logical architecture of a communication system according to a plurality of embodiments including the present embodiment. The architecture of the communication system can be illustrated as that in FIG. 7 in view of a backhaul. In the example in FIG. 8, the communication system includes a first core network node 10, a second core network node 20, a first radio access apparatus 31, a second radio access apparatus 32, and a radio communication terminal 40. A backhaul 50 (e.g., an Aggregation Domain Network), backhauls 51 to 53 (e.g., an Access Domain Network), and a backhaul 54 (e.g., a Core Domain Network) exist for each of the apparatuses. The backhauls according to the present example embodiment may include a Metro Domain not illustrated. A backhaul between nodes may be connected via a router and a switch. The router and switch may be an ABR (an Area Border Router) and a PE (a Provider Edge), for example.

The first core network node 10 is connected to the first radio access apparatus 31 via a C-Plane interface and performs control processing for authentication of the radio communication terminal 40, a handover between radio access apparatuses, cell selection and reselection, etc. The C-Plane interface is established by using the backhauls 50, 51, and 54.

The first core network node 10 may be configured to serve as a gateway as well when the radio communication terminal 40 performs data communication. Namely, the first core network node 10 may be connected to at least one of the first radio access apparatus 31 and the second radio access apparatus 32 via a U-Plane interface. The U-Plane interface can be established by using the backhauls 50, 51, 52 and 54.

The second core network node 20 is connected to the first radio access apparatus 31 and the second radio access apparatus 32 via an U-Plane interface and has a function of a gateway for providing a bearer, which is a data communication transmission path for the radio communication terminal. More specifically, to provide a bearer, the second core network node 20 establishes a packet forwarding tunnel (e.g. a GTP (GPRS (General Packet Radio Service) Tunneling Protocol) Tunnel) with the radio access apparatuses 31 and 32 in coordination with the first core network node 10. The U-Plane interface is constructed using the backhauls 50, 51, 52, and 54.

In addition, the first core network node 10 and the second core network node 20 may be connected to each other via at least one of the U-Plane and C-Plane interfaces. The U-Plane and C-Plane interfaces can be constructed using the backhaul 54.

The first radio access apparatus 31 and the second radio access apparatus 32 control a radio link for the radio communication terminal 40 and provide to the radio communication terminal 40 a Radio Connection (e.g., a DRB or an SRB) between the radio communication terminal 40 and a radio access network (RAN). In addition, the first radio access apparatus 31 is connected to the first core network node 10 via a C-Plane interface and is connected to the second core network node 20 via a U-Plane interface. The second radio access apparatus 32 is connected to the second core network node 20 via a U-Plane interface. The first radio access apparatus 31 and the second radio access apparatus 32 are connected to each other via U-Plane and C-Plane interfaces. The U-Plane and C-Plane interfaces between the radio access apparatuses are constructed using the backhaul 53.

The radio communication terminal 40 is connected to the first radio access apparatus 31 and the second radio access apparatus 32 via radio interface(s). More specifically, the radio communication terminal 40 is connected to the first radio access apparatus 31 via a C-Plane interface and communicates a control signal (s) with the first radio access apparatus 31. Furthermore, the radio communication terminal 40 is connected to each of the first radio access apparatus 31 and the second radio access apparatus 32 via a U-Plane interface and communicates user data with them. The radio communication terminal 40 may be connected to the second radio access apparatus 32 via a C-Plane interface.

A radio access apparatus is also referred to as a base station, a radio station, or an access point and may include a relay node or a CU (a Central Unit) and a DU (a Distributed Unit) in a C-RAN (Cloud Radio-access network).

In interworking between different radio access apparatuses (e.g., DC, LWA, or LTE-NG Tight Interworking), a radio access apparatus (e.g., an MeNB in DC) that establishes the C-Plane with a radio communication terminal can be referred to as an anchor node.

The radio communication terminal (radio terminal) 40 can be referred to as an MS (a Mobile Station) or a WTRU (Wireless Transmit/Receive Unit), in addition to a UE.

The communication system according to the present embodiment (or the nodes included in the communication system) supports a plurality of types of communication paths in which user data goes through at least one of the first radio access apparatus 31 and the second radio access apparatus 32. More specifically, the communication system according to the present embodiment supports two or more types of communication paths illustrated in FIG. 9, regarding a communication path for user data (downlink data) that is provided to the radio communication terminal 40.

Figure 9:
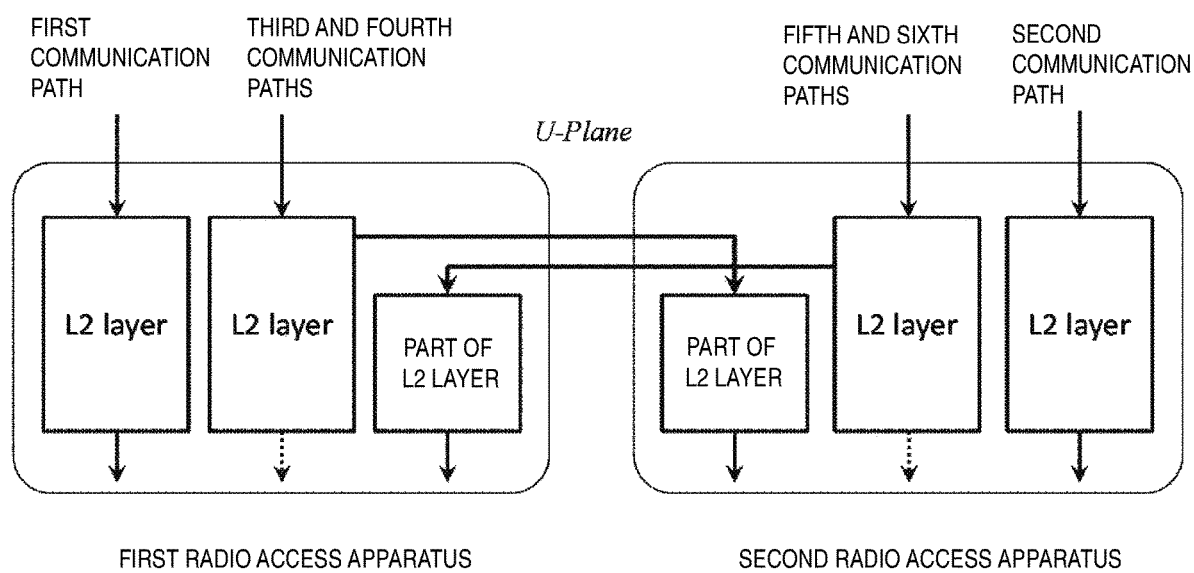
FIG. 9 is a diagram illustrating examples of a plurality of types of communication paths in the communication system according to the first example embodiment.

Communication path types illustrated in FIG. 9 are as follows:
  a first communication path that goes through only the first radio access apparatus 31;
  a second communication path that goes through only the second radio access apparatus 32;
  a third communication path in which a part of traffic of downlink user data that has arrived at the first radio access apparatus 31 goes through the second radio access apparatus 32 and the remaining part of the traffic goes through the first radio access apparatus 31;
  a fourth communication path in which traffic of downlink user data that has arrived at the first radio access apparatus 31 goes through only the second radio access apparatus 32;
  a fifth communication path in which a part of traffic of downlink user data that has arrived at the second radio access apparatus 32 goes through the first radio access apparatus 31 and the remaining part of the traffic goes through the second radio access apparatus 32; and
  a sixth communication path in which traffic of downlink user data that has arrived at the second radio access apparatus 32 goes through only the first radio access apparatus 31.

The first communication path with the second core network node 20 is terminated in the first radio access apparatus 31. In the case of this communication path type, the second radio access apparatus 32 is not involved in U-Plane data transmission to the radio communication terminal 40. The first communication path is, for example, an MCG bearer in DC or LTE-NG Tight Interworking or an LTE bearer in LWA.

The second communication path with the second core network node 20 is terminated in the second radio access apparatus 32. In the case of this communication path type, the first radio access apparatus 31 is not involved in U-Plane data transmission to the radio communication terminal 40. In the second communication path is, for example, an SCG bearer in DC or LTE-NG Tight Interworking.

The third communication path with the second core network node 20 is terminated in the first radio access apparatus 31. A part of data in Layer-2 (e.g., PDCP, RLC (Radio Link Control), and MAC (Media Access Control)) processed in the first radio access apparatus 31 is forwarded to the second radio access apparatus 32 via an inter-radio-access-apparatus interface (e.g., X2, Xw, or Xn). In the case of this communication path type, the first radio access apparatus 31 and the second radio access apparatus 32 are both involved in U-Plane data transmission to the radio communication terminal 40. The third communication path is, for example, a Split bearer in DC, LTE-NG Tight Interworking, or a Split LWA bearer in LWA.

The fourth communication path with the second core network node 20 is terminated in the first radio access apparatus 31. All of the data in Layer-2 (e.g., PDCP, RLC, and MAC) processed in the first radio access apparatus 31 is forwarded to the second radio access apparatus 32 via the inter-radio-access-apparatus interface. In the case of this communication path type, the first radio access apparatus 31 is not involved in U-Plane data transmission to the radio communication terminal 40. The fourth communication path is, for example, a Switched LWA bearer in LWA.

The fifth communication path with the second core network node 20 is terminated in the second radio access apparatus 32. A part of the data in Layer-2 (e.g., PDCP, RLC, and MAC) processed in the second radio access apparatus 32 is forwarded to the first radio access apparatus 31 via the inter-radio-access-apparatus interface. In the case of this communication path type, the first radio access apparatus 31 and the second radio access apparatus 32 are both involved in U-Plane data transmission to the radio communication terminal 40. The fifth communication path is, for example, an SCG Split bearer in LTE-NG Tight Interworking.

The sixth communication path with the second core network node 20 is terminated in the second radio access apparatus 32. All of the data in Layer-2 (e.g., PDCP, RLC, and MAC) processed in the second radio access apparatus 32 is forwarded to the first radio access apparatus 31 via an inter-radio-access-apparatus interface. In the case of this communication path type, the second radio access apparatus 32 is not involved in the U-Plane data transmission to the radio communication terminal 40.

Figure 10:
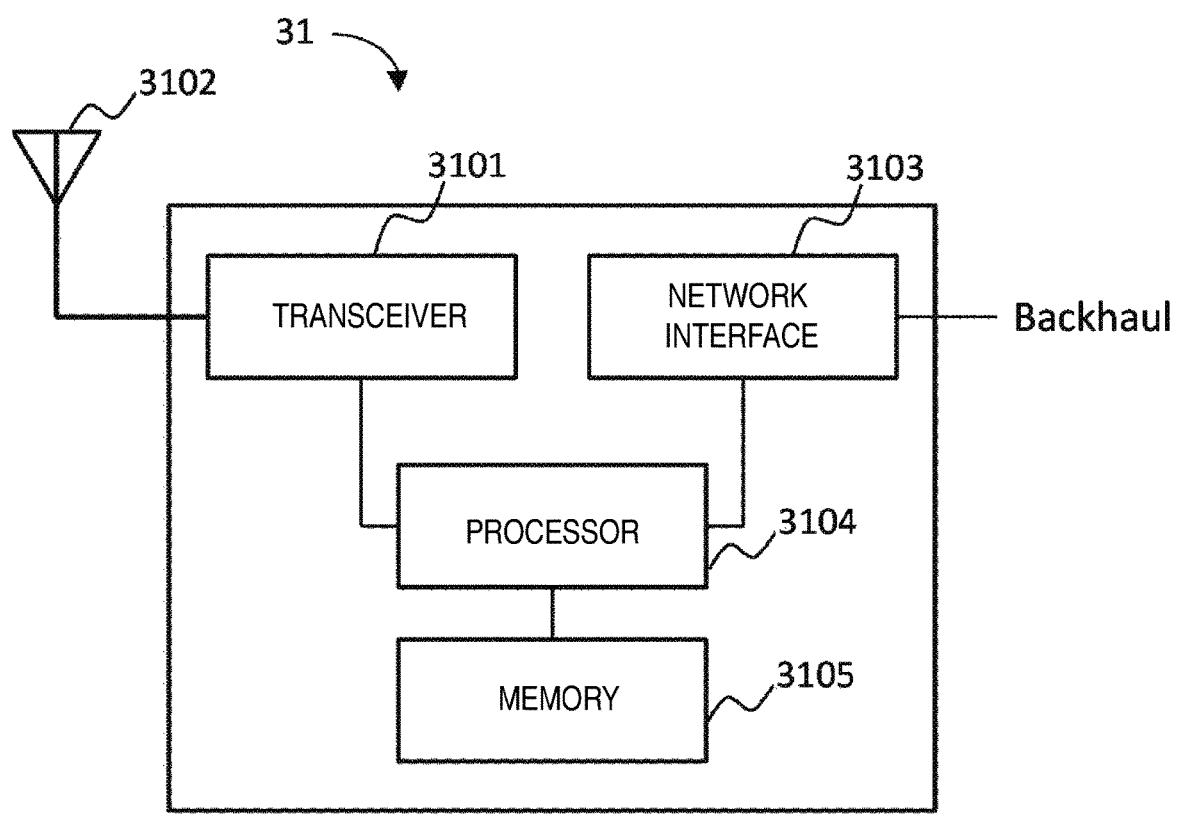
FIG. 10 is a block diagram illustrating a configuration example of a first radio access apparatus according to the first example embodiment.

FIG. 10 is a block diagram illustrating a structural example of the first radio access apparatus 31 according to the present embodiment. The second radio access apparatus 32 may have the same structure as that in FIG. 10. As illustrated in FIG. 10, the first radio access apparatus 31 includes a transceiver 3101, an antenna 3102, a network interface 3103, a processor 3104, and a memory 3105. The transceiver 3101 performs analog RF (Radio Frequency) signal processing related to a PHY (Physical) layer for communicating with the radio communication terminal 40, for example. The transceiver 3101 may include a plurality of transceivers.

The network interface 3103 is used for communicating with core network nodes (e.g., an MME and an S-GW in EPC) and other radio access apparatus(es). The network interface 3103 may include, for example, a network interface card (NIC) that complies with the IEEE (Institute of Electrical and Electronics Engineers) 802.3 series.

The processor 3104 performs digital baseband signal processing (U-Plane processing) and C-Plane processing for a radio communication. For example, in the case of LTE and LTE-Advanced (Pro), the digital baseband signal processing performed by the processor 3104 may include PDCP layer, RLC layer, MAC layer, and PHY layer signal processing. The control plane processing performed by the processor 3104 may include S1 protocol, RRC protocol, and MAC CE (Control Element) processing.

The processor 3104 according to the present example embodiment acquires service characteristic information that indicates a characteristic of a service provided to the radio communication terminal 40 via the transceiver 3101 or the network interface 3103 and stores the acquired service characteristic information in the memory 3105. The processor 3104 may further acquire backhaul characteristic information that indicates a backhaul domain type(s) between (among) apparatuses via the network interface 3103 and stores the acquired backhaul characteristic information in the memory 3105.

Among the plurality types of communication paths supported in the communication system to which the first radio access apparatus 31 belongs, the processor 3104 determines one downlink data communication path type used for provision of a service to the radio communication terminal 40, based on the service characteristic information stored in the memory 3105. The processor 3104 may determine the communication path type in view of the backhaul characteristic information. An operation relating to the determination of the communication path type will be later described in detail.

The processor 3104 may include a plurality of processors. For example, the processor 3104 may include a modem processor (e.g., a Digital Signal Processor (DSP)) that performs digital baseband signal processing and a protocol stack processor (e.g., a Central Processing Unit (CPU) or a Micro Processing Unit (MPU)) that performs control plane processing.

The memory 3105 is configured by a combination of a volatile memory and a non-volatile memory. The volatile memory may be, for example, a Static Random Access Memory (SRAM), a Dynamic RAM (DRAM), or a combination thereof. The non-volatile memory is, for example, a mask Read Only Memory (MROM), a Programmable ROM (PROM), a flash memory, a Hard Disk Drive (HDD), or a combination thereof. The memory 3105 may include a storage arranged separately from the processor 3104. In this case, the processor 3104 may access the memory 3105 via the network interface 3103 or an I/O (Input/Output) interface not illustrated.

The memory 3105 may hold a software module(s) (a computer program(s)) including instructions and data for performing processing of the first radio access apparatus 31 described in a plurality of embodiments including the present example embodiment. In some implementations, the processor 3104 may be configured to read a software module(s) from the memory 3105 and execute the software module(s) to perform processing of the first radio access apparatus 31 described in the plurality of embodiment including the present embodiment.

In the present embodiment information indicating communication path types and service characteristic information are stored in the memory 3105. More specifically, a communication path type database (FIG. 14) which is a list of a plurality of types of communication paths and a service characteristic database (401 in FIGS. 13A and 13B) which is a list of service characteristic information are constructed to be stored in the memory 3105. Furthermore, a radio communication terminal database (403 in FIG. 17), a radio access apparatus database (404 in FIG. 18), and a database (backhaul characteristic database 405 in FIG. 19) which is a list of backhaul characteristic information may be constructed and stored in the memory 3105. In the memory 3105, these databases may be constructed and stored as parts of the above software module(s) or separately from the software module(s). The information stored in these databases and processing performed by the processor 3105 by using the information will be later described in detail.

The structure of the first radio access apparatus 31 is not limited to that illustrated in FIG. 10. For example, the first radio access apparatus 31 may be configured to include function units that perform steps (steps 1201 and 1202) in the following procedure 1200. Namely, the first radio access apparatus 31 may have a configuration which has an acquisition unit that acquires service characteristic information indicating a characteristic of a service provided to the radio communication terminal 40 and a determination unit that determines, among the plurality types of communication paths in which downlink user data goes through at least one of the first radio access apparatus 31 and the second radio access apparatus 32, a communication path type for downlink user data used for provision of the service to the radio communication terminal 40, based on the service characteristic information.

Figure 11:
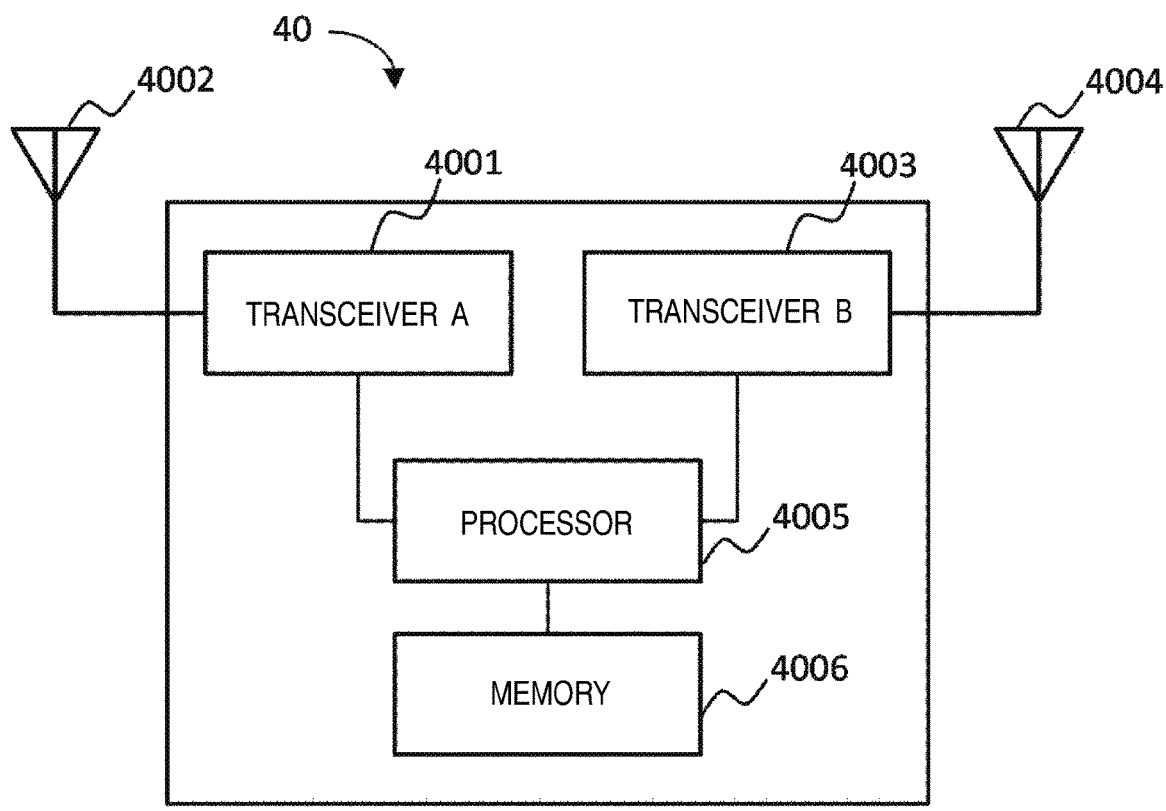
FIG. 11 is a block diagram illustrating a configuration example of a radio communication terminal according to the first example embodiment.

FIG. 11 is a block diagram illustrating a configuration example of the radio communication terminal 40 according to the present example embodiment. As illustrated in FIG. 11, the radio communication terminal 40 includes a transceiver A4001, an antenna 4002, a transceiver B4003, an antenna 4004, a processor 4005, and a memory 4006. To communicate with the first radio access apparatus 31, the transceiver A4001 performs analog RF signal processing related to a PHY layer of the RAT supported by the first radio access apparatus 31. The transceiver A4001 is connected to the antenna 4002 and the processor 4005.

To communicate with the second radio access apparatus 32, the transceiver B4003 performs analog RF signal processing related to the PHY layer of the RAT supported by the second radio access apparatus 32. The transceiver B4003 is connected to the antenna 4004 and the processor 4005. The analog RF signal processing performed by the transceivers A4001 and B4003 includes frequency up-conversion, frequency down-conversion, and amplification.

The processor 4005 performs digital baseband signal processing (U-Plane processing) and C-Plane processing for a radio communication. The U-Plane processing and the C-Plane processing include processing in layer 1, layer 2 and layer 3. More specifically, the U-Plane processing may include signal processing in the Packet Data Convergence Protocol (PDCP) layer, the Radio Link Control (RLC) layer, the MAC layer, and the PHY layer. The C-Plane processing may include Non-Access Stratum (NAS) protocol, RRC protocol, and MAC CE processing.

The processor 4005 may include a plurality of processors. For example, the processor 4005 may include a modem processor (e.g., a DSP) that performs digital baseband signal processing and a protocol stack processor (e.g., CPU or MPU) that performs control plane (C-plane) processing.

The memory 4006 is configured by a combination of a volatile memory and a non-volatile memory. The volatile memory is, for example, an SRAM, a DRAM, or a combination thereof. The non-volatile memory is, for example, an MROM, a PROM, a flash memory, an HDD, or a combination thereof. The memory 4006 may include a storage arranged separately from the processor 4005.

The memory 4006 may hold a software module(s) (a computer program(s)) including instructions and data for performing processing of the radio communication terminal 40 described in a plurality of example embodiments including the present example embodiment. In some implementations, the processor 4005 may be configured to read the software module(s) from the memory 4006 and execute the read software module(s) to perform the processing of the radio communication terminal 40 described in the plurality of example embodiment including the present example embodiment.

More specifically, the memory 4006 may hold control information including communication path types received from the first or second radio access apparatus 31 or 32. The processor 4005 may cause the transceivers A4001 and B4003 to receive downlink user data from at least one of the first radio access apparatus and the second radio access apparatus in a communication path corresponding to the communication path type included in the control information stored in the memory 4006.

The processor 4005 may cause the transceiver A4001 or B4003 to transmit a service transmission request to the first or second core network node 10 or 20 or an upper network node (e.g., an application server) via the first or second radio access apparatus 31 or 32. The processor 4005 may perform processing such that the service transmission request includes the service characteristic information.

The configuration of the radio communication terminal 40 is not limited to that illustrated in FIG. 11. For example, the radio communication terminal 40 may be configured to include function units that perform steps (steps 1501 and 1502) in the following procedure 1500. Namely, the radio communication terminal 40 may include a reception unit which receives control information that includes a type of a communication path for downlink user data used for provision of a service to the radio communication terminal 40 from the first radio access apparatus 31 or the second radio access apparatus 32 among the plurality types of communication paths which go through at least one of the first radio access apparatus 31 and the second radio access apparatus 32. The reception unit receives the downlink user data from at least one of the first radio access apparatus 31 and the second radio access apparatus 32 in a communication path corresponding to the communication path type included in the control information.

[Description of Operation]

Figure 12:
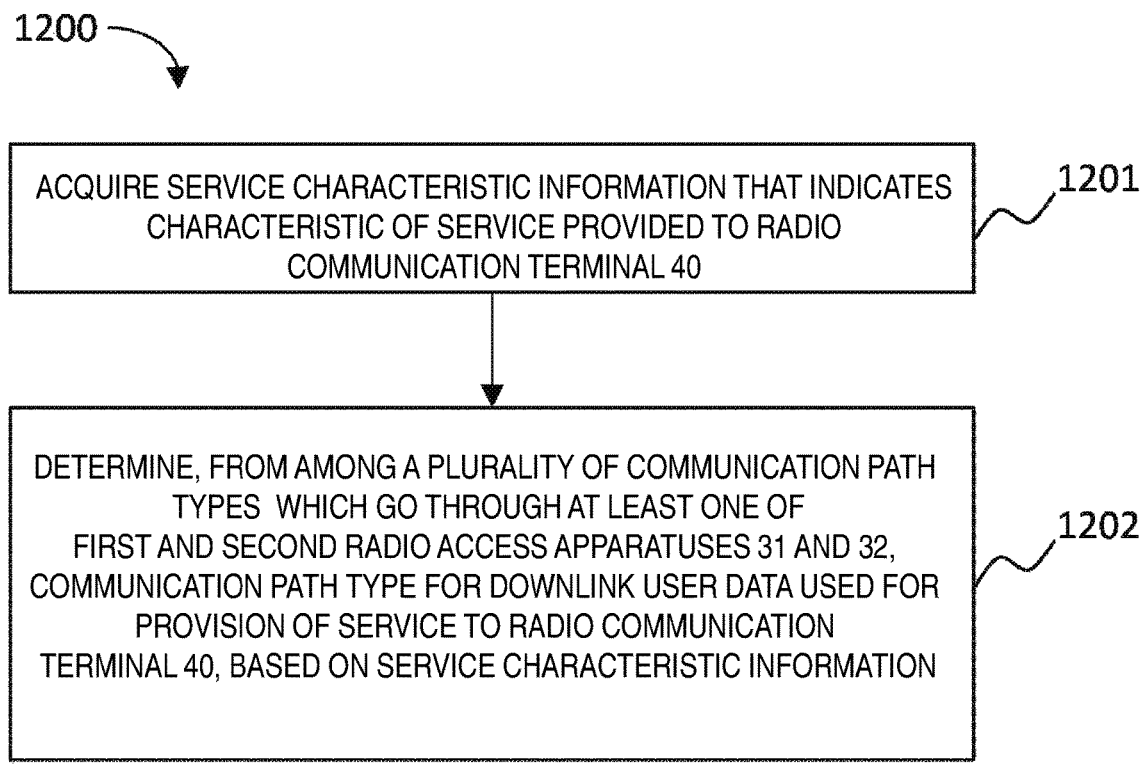
FIG. 12 is a flowchart illustrating an example of a procedure performed by the first radio access apparatus according to the first example embodiment.

Next, an example of an operation of the first radio access apparatus 31 illustrated in FIG. 12 will be described by using a procedure 1200. While the procedure 1200 is performed when the radio communication terminal 40 has established a radio connection (e.g., an RRC Connection) (RRC Connected) with the first radio access apparatus 31, the present disclosure is not limited to this example. For example, even when there is no radio connection (e.g., RRC Idle) between the radio communication terminal 40 and the first radio access apparatus 31, the procedure 1200 may be performed if the first radio access apparatus 31 has context information (e.g., UE Context) about the radio communication terminal 40.

The procedure 1200 is performed before or when a preparation procedure for providing multiple radio resources of the first radio access apparatus 31 and the second radio access apparatus 32 for the radio communication terminal 40, namely, a preparation procedure (e.g., SeNB Addition Procedure) for interworking (e.g., DC) between different radio access apparatuses, is performed. However, the procedure 1200 is not limited to this example. Alternatively, the procedure 1200 may be performed after the preparation procedure is completed. Still alternatively, the procedure 1200 may be performed before or when a modification procedure of a network bearer used for interworking between different radio access apparatuses (e.g., SeNB Modification Procedure)) is performed. Alternatively, the procedure 1200 may be performed when the radio quality with the second radio access apparatus 32 reported from the radio communication terminal 40 (namely, in a cell(s) managed by the second radio access apparatus 32) satisfies a predetermined condition (s).

In step 1201, the first radio access apparatus 31 acquires service characteristic information indicating a characteristic of a service provided to the radio communication terminal 40. More specifically, the first radio access apparatus 31 receives service characteristic information about the radio communication terminal 40 via the transceiver 3101 from the radio communication terminal 40 or the network interface 3103 from the first core network node 10. For example, the service characteristic information includes at least one of a desired band (allowable band), an allowable delay time, a desired reliability (allowable reliability), a resource type, a priority level, and a packet error loss rate. However, the service characteristic information is not limited to this example. It is noted that the resource type (GBR (Guaranteed Bit Rate) or Non-GBR), Priority Level, Packet Error Loss Rate, allowable delay time (Packet Delay Budget), and the service type may be associated with a QoS (Quality of Service) Class Identifier (QCI), as described in NPL 5. In this case, the QCI may be included in the service characteristic information.

In the case of LTE/LTE-Advanced (Pro), the service characteristic information may be included in a UE Information Response message which is transmitted from the UE to the (M)eNB. Alternatively, the service characteristic information may be transmitted by using an INITIAL CONTEXT SETUP REQUEST message, a DOWNLINK NAS TRANSPORT message, or a HANDOVER REQUEST message transmitted from the MME to the (M)eNB. In the latter case, the service characteristic information may be an IE (Information Element) included in an E-RAB Level QoS Parameters IE.

Figure 13A:
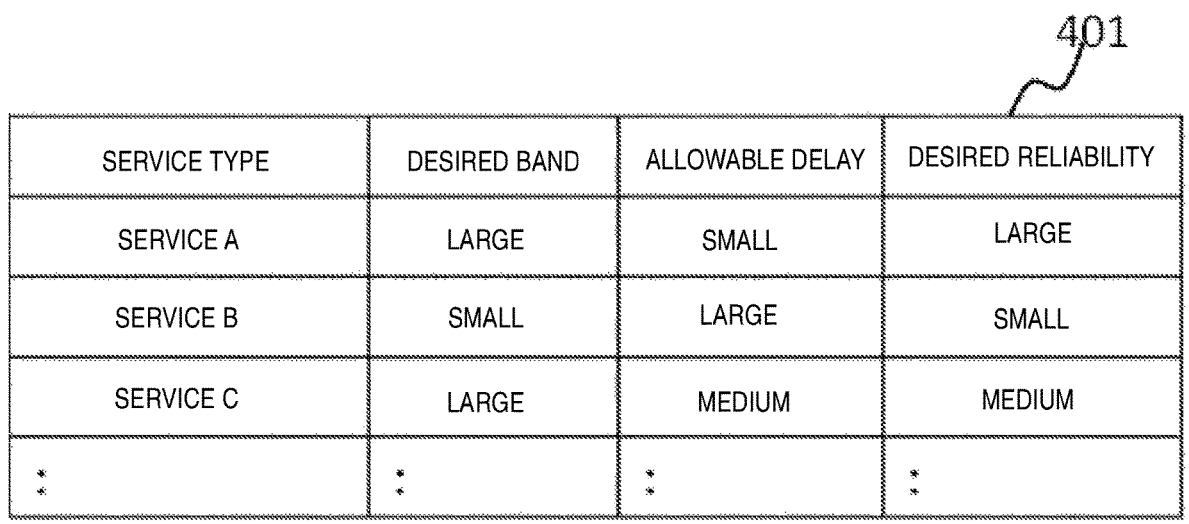
FIG. 13A is a diagram illustrating an example of a service characteristic database according to a plurality of example embodiments.
Figure 13B:
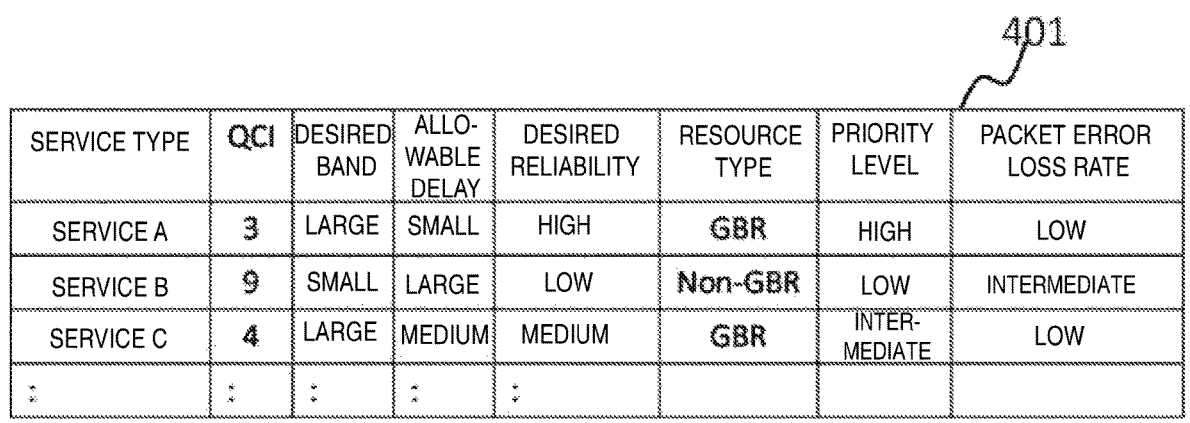
FIG. 13B is a diagram illustrating another example of the service characteristic database according to a plurality of example embodiments.

The first radio access apparatus 31 stores (updates) the received service characteristic information in the service characteristic database in the memory 3105. The service characteristic information may be stored in the memory 3105 as the UE Context of the radio communication terminal 40. FIG. 13 (FIGS. 13A and 13B) illustrates examples of the service characteristic database. At least one of a desired band (a desired bit rate), an allowable delay time, a desired reliability, a resource type (GBR (Guaranteed Bit Rate) or Non-GBR), a priority level, an allowable error loss rate, and a QCI, may be associated with at least one of the service types in the service characteristic database. For example, as illustrated in FIG. 13A, a desired band, an allowable delay, and a desired reliability may be associated with a service type in the service characteristic database 401. Alternatively, as illustrated in FIG. 13B, a QCI, a desired band, an allowable delay, a desired reliability, a resource type, a priority level, and a packet error loss rate may be associated with a service type. In FIGS. 13A and 13B, while a desired band (desired bit rate), an allowable delay time, and a desired reliability are represented by indexes "large", "medium", and "small", the present invention is not limited to this example. These items of information may be represented by using thresholds. For example, the desired band may be represented as "100 Mbps" (or more), the allowable delay time as (less than) "100 msec", and the desired reliability as "95%" (or more).

The service characteristic database 401 may be provided in the memory 3105 per radio communication terminal 40. Alternatively, in addition to the service characteristic database 401 provided in the memory 3105, a database in which a service type and a radio communication terminal are associated with each other may be also provided in the memory 3105. The latter database may be referred to as a radio communication terminal database. In this way, the service characteristic information about services provided to radio communication terminals is stored in the memory 3105.

Next, in step 1202, the first radio access apparatus 31 determines, among the plurality types of communication paths which go through at least one of the first radio access apparatus 31 and the second radio access apparatus 32, a communication path type for the downlink user data used for provision of the service to the radio communication terminal 40, based on the service characteristic information.

For example, when the service provided to the radio communication terminal 40 is a service A (e.g., a real-time game), the processor 3104 in the first radio access apparatus 31 selects the third communication path as a communication path type, since a desired band, an allowable delay, and a desired reliability of the service A represent "large", "small", and "large", respectively, in the service characteristic database 401 (FIGS. 13A and 13B). In the third communication path, the first radio access apparatus 31 and the second radio access apparatus 32 are both involved in U-Plane data transmission to the radio communication terminal 40. Thus, since the radio resources of both of the first radio access apparatus 31 and the second radio access apparatus 32 can be used for the service provided to the radio communication terminal 40. This can contribute to a larger band reservation, as compared with a case where the processor 3104 selects any other communication path which goes through only one radio access apparatus.

In contrast, for example, when the service provided to the radio communication terminal 40 is a service B (e.g., an E-mail service), the processor 3104 in the first radio access apparatus 31 selects the first or second communication path as a communication path type, since a desired band, an allowable delay, and a desired reliability of the service are "small", "large", and "small", respectively, in the service characteristic database 401 (FIGS. 13A and 131B). In the first or second communication path, downlink U-Plane data goes through only one radio access apparatus and the other radio access apparatus is not involved in downlink U-Plane data transmission. Thus, only the radio resources of a single radio access apparatus are used for providing the service to the radio communication terminal 40. Regarding the service B, a desired band and a desired reliability are both small and an allowable delay is large. Thus, only the radio resources of a single radio access apparatus are probably sufficient to provide the service B to the radio communication terminal 40. In addition, since only one radio access apparatus is involved in U-Plane data transmission, the service can be provided without affecting the resources (e.g., radio resources and computer resources) of the other radio access apparatus. This can contribute to waste reduction of resources of the network as a whole.

Figure 14:
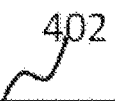
FIG. 14 is a diagram illustrating an example of a communication path type database according to a plurality of example embodiments.

As illustrated in FIG. 14, a database 402 for a plurality of types of communication paths which go through at least one of the first radio access apparatus 31 and the second radio access apparatus 32 may be stored in the memory 3105 in the first radio access apparatus 31.

The procedure 1200 may be performed by the second radio access apparatus 32. For example, upon reception of a request (e.g., an SeNB Addition Request) for preparing interworking between different radio access apparatuses from the first radio access apparatus 31, the second radio access apparatus 32 performs the procedure 1200, includes the selected communication path type into a preparation completion message (e.g., an SeNB Addition Request Acknowledge), and sends the preparation completion message.

Figure 15:
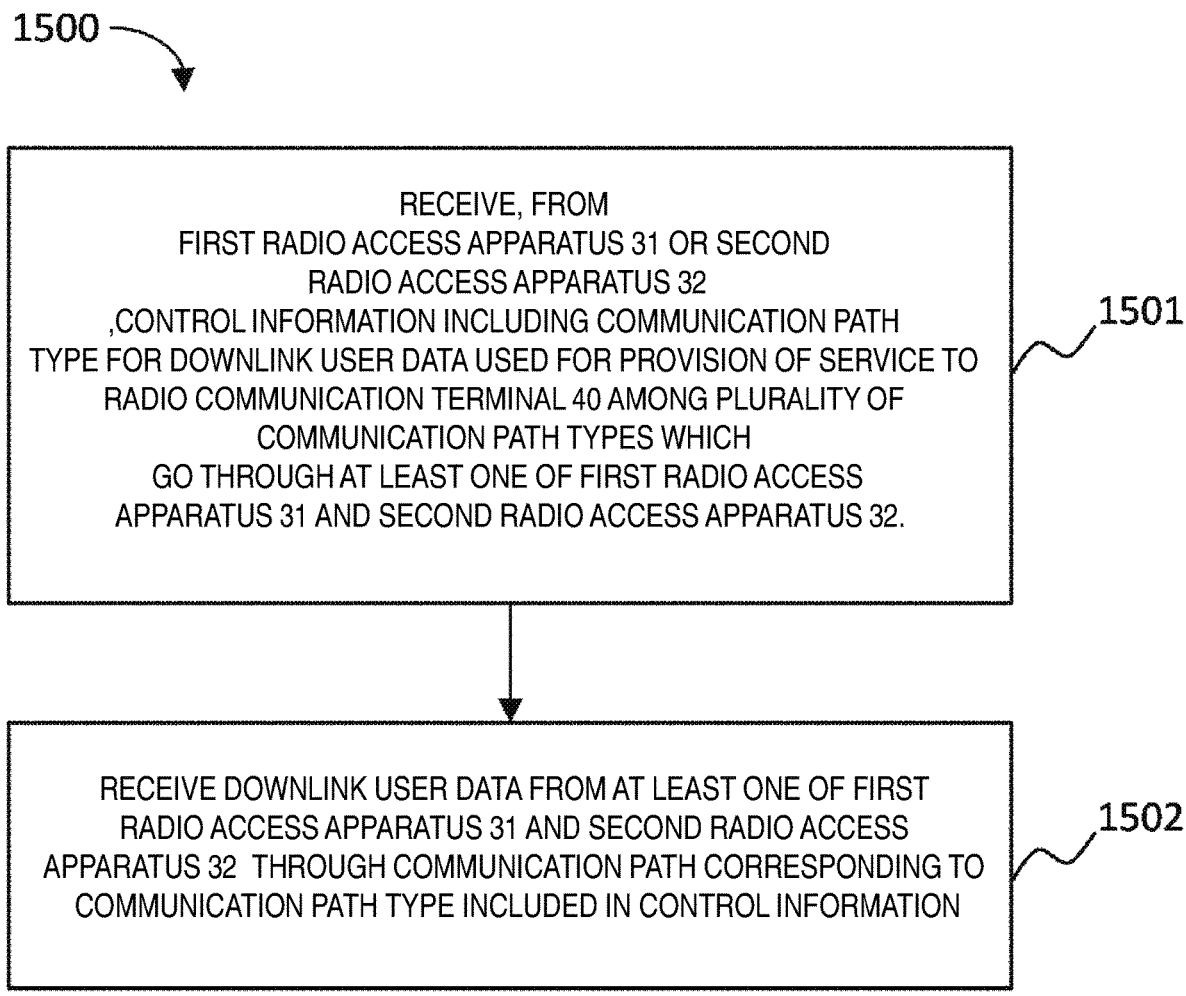
FIG. 15 is a flowchart illustrating an example of a procedure performed by the radio communication terminal according to the first example embodiment.

The following describes an example of an operation of the radio communication terminal 40 by using a procedure 1500 in FIG. 15. While the procedure 1500 is performed when the radio communication terminal 40 has established a radio connection (e.g., an RRC Connection) with the first radio access apparatus 31 or the second radio access apparatus 32, the procedure 1500 is not limited to this example. For example, even when the radio communication terminal 40 has not established a radio connection with the first radio access apparatus 31 and the second radio access apparatus 32 (e.g., RRC Idle), the radio communication terminal 40 can perform the procedure 1500 along with a radio connection establishment procedure when the radio communication terminal 40 receives notification information (e.g., system information) or a paging message.

In step 1501, the radio communication terminal 40 receives control information including a communication path type from the first radio access apparatus 31 or the second radio access apparatus 32. In the case of LTE/LTE-A (Pro), the control information can be transmitted from the first radio access apparatus 31 or the second radio access apparatus 32 by using RRC Signaling (e.g., an RRC Connection Reconfiguration message) or MAC CE.

The communication path type included in the control information is a communication path type selected by the first radio access apparatus 31 or the second radio access apparatus 32 based on the service characteristic information indicating characteristic of the service to be provided to the radio communication terminal 40 from among the plurality of types of communication paths which go through at least one of the first radio access apparatus 31 and the second radio access apparatus 32.

In the case of LTE/LTE-Advanced (Pro), the communication path type may be identified for the radio communication terminal 40 by setting one of an MCG bearer, an SCG bearer, and a Split bearer as a DRB-Type IE. Alternatively, the communication path type may be identified for the radio communication terminal 40 by determining based on whether an configured DRB-ID is the same or not, as will be later described.

Next, in step 1502, the radio communication terminal 40 receives downlink user data from at least one of the first radio access apparatus 31 and the second radio access apparatus 32 in a communication path corresponding to the communication path type included in the control information. More specifically, the processor 4005 in the radio communication terminal 40 re-configures its own configuration (UE Configuration) so that the radio communication terminal 40 can receive downlink user data from at least one of the first radio access apparatus 31 and the second radio access apparatus 32 in a communication path corresponding to the communication path type included in the control information. The re-configuration of its own configuration (UE configuration) includes re-establishment or re-configuration of layer-2 entities (e.g., PDCP, RLC, and MAC) corresponding to the communication path type and re-configuration of radio resource configuration information and communication path configuration information (e.g. DRB Configuration).

For example, when a service provided to the radio communication terminal 40 is the service A (e.g., a real-time game), the processor 4005 in the radio communication terminal 40 receives control information including the third communication path type from the first radio access apparatus 31 that has performed the procedure 1200, via the transceiver A4001 and stores the control information in the memory 4006. Then, the processor 4005 in the radio communication terminal 40 re-configures its own configuration (UE Configuration) adapted to the third communication path in order to receive the U-Plane data from both of the first radio access apparatus 31 and the second radio access apparatus 32.

In contrast, when a service provided to the radio communication terminal 40 is the service B (e.g., an E-mail service), the processor 4005 in the radio communication terminal 40 receives control information including the first or second communication path type from the first radio access apparatus 31 that has performed the procedure 1200, via the transceiver A4001 and stores the control information in the memory 4006. Then, the processor 4005 in the radio communication terminal 40 re-configures its own configuration (UE Configuration) adapted to the first or second communication path in order to receive the U-Plane data only from one of the first radio access apparatus 31 and the second radio access apparatus 32.

In this way, using a communication path that is able to satisfy a service requirement(s) of a service provided to the radio communication terminal 40, the service can be provided to the radio communication terminal 40 via at least one of the first radio access apparatus 31 and the second radio access apparatus 32.

Second Embodiment

In the present embodiment, more specific examples of the communication system according to the first embodiment will be described.

Since the architecture of the communication system according to the present embodiment is the same as the architecture in FIG. 8, the description thereof will be omitted.

[Description of Operation]

Figure 16:
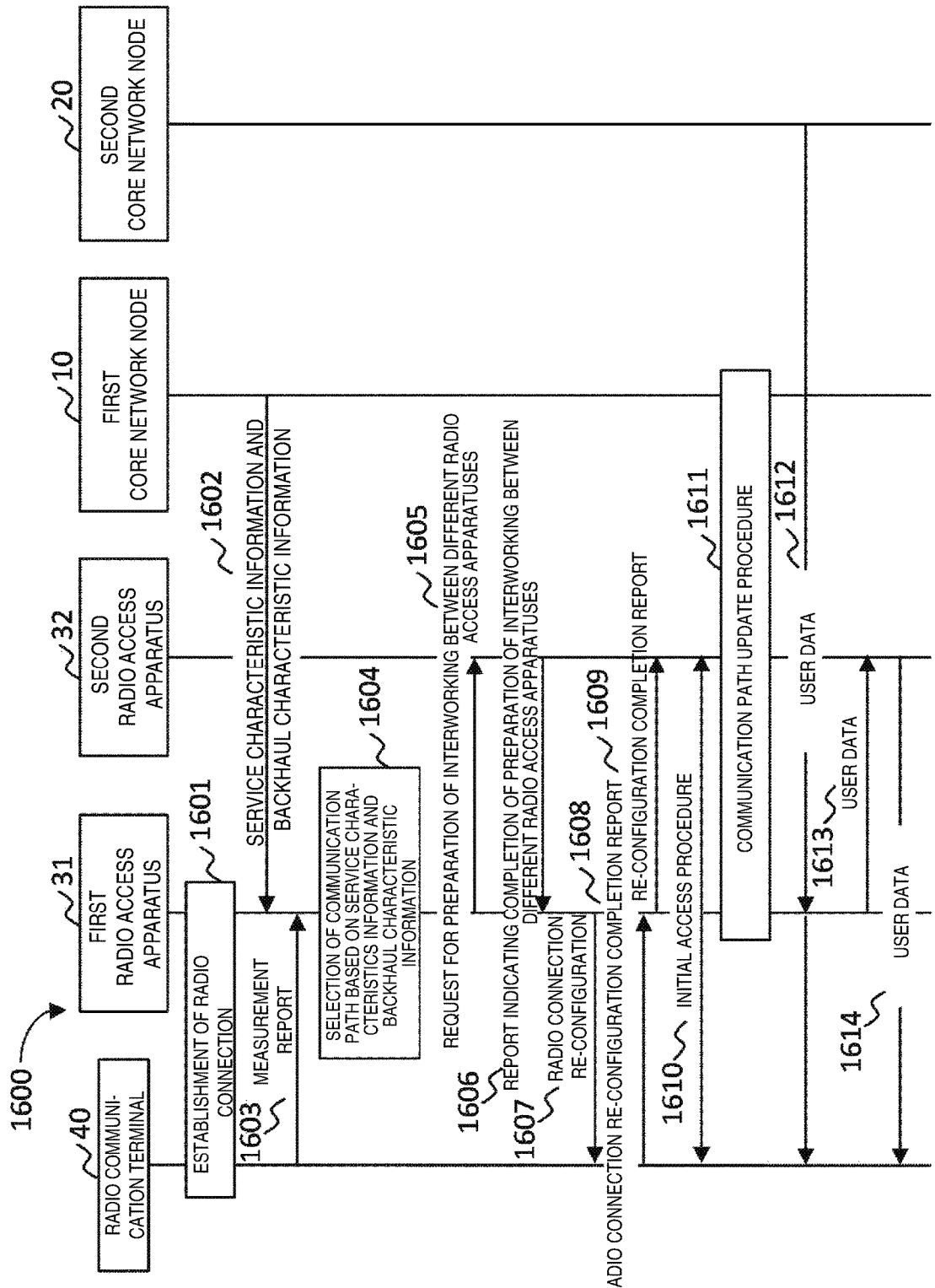
FIG. 16 is a sequence diagram illustrating an example of an overall procedure of a communication system according to a second example embodiment.

FIG. 16 is a procedure (a procedure 1600) illustrating an example of an overall operation of the communication system according to the present embodiment.

In step 1601, the radio communication terminal 40 establishes a radio connection with the first radio access apparatus 31. For example, in the case of LTE/LTE-Advanced (Pro), a Random Access Procedure, an RRC Connection Establishment Procedure, or the like is used to establish a radio connection (e.g., an RRC connection).

In step 1602, the first radio access apparatus 31 receives service characteristic information and backhaul characteristic information from the first core network node 10, via the network interface 3103. For example, in the case of LTE/LTE-Advanced (Pro), the service characteristic information and the backhaul characteristic information may be transmitted by using an INITIAL CONTEXT SETUP REQUEST message or a DOWNLINK NAS TRANSPORT message.

The first radio access apparatus 31 may receive the service characteristic information from the radio communication terminal 40, instead of from the first core network node 10. In the case of LTE/LTE-Advanced (Pro), the service characteristic information may be included in a UE Information Response message which is transmitted from the UE to the (M)eNB.

Alternatively, the first radio access apparatus 31 may receive the backhaul characteristic information from the second radio access apparatus 32 and the second core network node 20, instead of from the first core network node 10. In the case of LTE/LTE-Advanced (Pro), the backhaul characteristic information may be included in a message (e.g., an S1 Setup Response or an X2 Setup Response) that the (M)eNB receives in an interface setting (Setup) procedure (e.g., an S1 Setup Procedure or an X2 Setup Procedure) between the (M)eNB and another node.

The backhaul characteristic information includes information about a domain type, an available band, a delay, and a reliability. The domain type may be a Core domain, an Aggregation domain, an Access domain, or a Metro domain. Alternatively, the domain type may indicate information about a backhaul realization method such as an optical communication, Ethernet (registered trademark), or a wireless communication (millimeter wave or microwave). Alternatively, the domain type may indicate information about a backhaul or information about a vendor of an apparatus to which a backhaul is connected.

In step 1502, the first radio access apparatus 31 stores the received service characteristic information and the backhaul characteristic information in the memory 3105.

In addition to the above described service characteristic database (e.g., 401 in FIG. 13A or FIG. 13B) and the communication path type database (e.g., 402 in FIG. 14), a radio communication terminal database (e.g., 403 in FIG. 17), a radio access apparatus database (e.g., 404 in FIG. 18), and a backhaul characteristic database (e.g., 405 in FIG. 19) are stored in the memory 3105 according to the present example embodiment.

Figure 17:
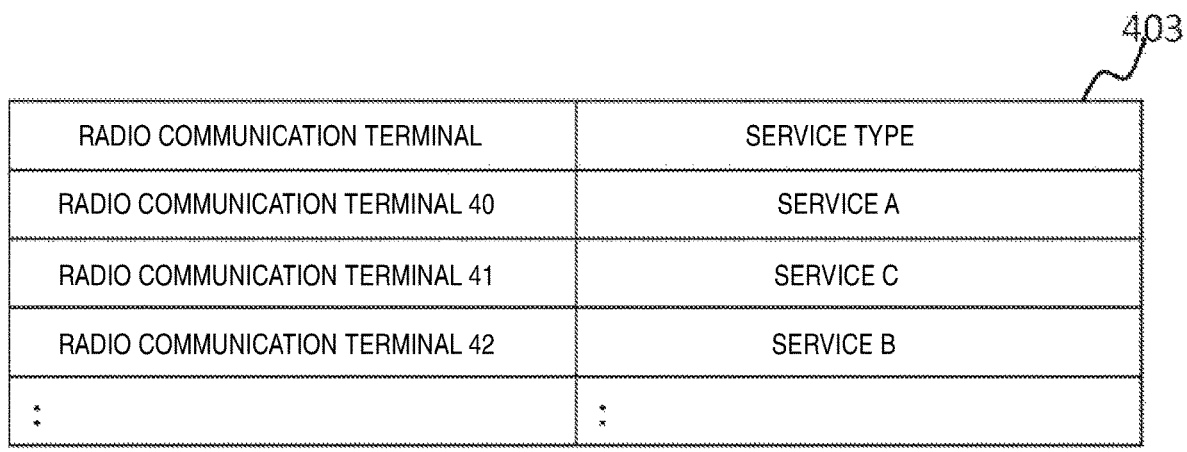
FIG. 17 is a diagram illustrating an example of a radio communication terminal database according to a plurality of example embodiments.

FIG. 17 is a diagram illustrating an example of the radio communication terminal database 403. The radio communication terminal database 403 holds a service type and radio communication terminal identification information in association with each other. In the case of LTE/LTE-Advanced (Pro), the radio communication terminal identification information may include one of: an eNB UE X2AP ID, an eNB UE S1AP ID, an MME UE S1AP ID, and an RNTI (Radio Network Temporary Identifier). Alternatively, the radio communication terminal identification information may include an IMEI (International Mobile Equipment Identity) or an IMSI (International Mobile Subscriber Identity).

Figure 18:
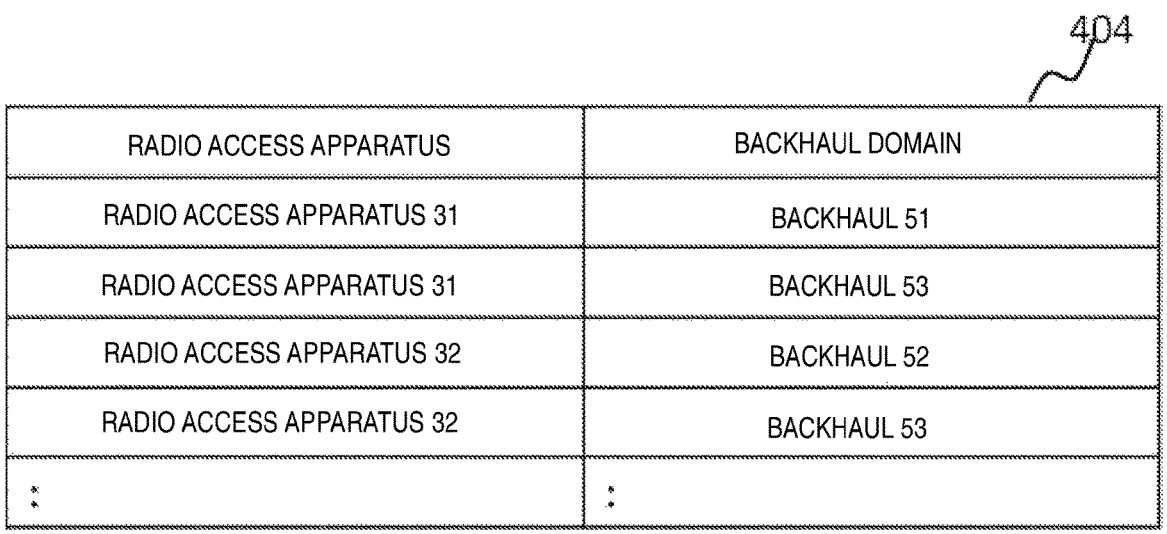
FIG. 18 is a diagram illustrating an example of a radio access apparatus database according to a plurality of example embodiments.

FIG. 18 is a diagram illustrating an example of the radio access apparatus database 404. The radio access apparatus database 404 holds identification information of each radio access apparatus and a backhaul domain type to which each radio access apparatus connects, in association with each other. It is noted that in addition to the radio access apparatus identification information, core network node identification information and a backhaul domain type may be stored in association with each other. In the case of LTE/LTE-Advanced (Pro), the radio access apparatus or core network node identification information may be a Global eNB ID or a GUMMEI (Globally Unique MME Identifier). Alternatively, the identification information may be indicated by a Transport Layer Address or a GTP (GPRS Tunneling Protocol) TEID (Tunnel Endpoint ID).

Figure 19:
FIG. 19 is a diagram illustrating an example of a backhaul characteristic database according to a plurality of example embodiments.

FIG. 19 is a diagram illustrating an example of the backhaul characteristic database 405. The backhaul characteristic database 405 holds information about a backhaul domain type, an available band, delay, and a reliability, in association with each other. In FIG. 19, while the available band (available bit rate), the delay time, and the reliability are represented by indices: "large", "medium", and "small", the present invention is not limited to this example. These items of information may be represented by using thresholds. For example, a threshold for a link band may be represented as "1 Gbps" (or more), for the delay time as (less than) "100 msec", and for the reliability as "98%" (or more).

Referring back to the procedure 1600, in step 1603, the first radio access apparatus 31 receives a measurement report from the radio communication terminal 40. More specifically, the first radio access apparatus 31 transmits an RRC Connection Reconfiguration message including measurement configuration information (e.g., Meas-Config IE) to the radio communication terminal 40. The radio communication terminal 40 performs measurement based on the measurement configuration information. The measurement includes Serving cell measurement and Neighbor cell measurement. The measurement may include not only Intra-RAT measurement but also Inter-RAT measurement. Namely, in the case of LTE/LTE-Advanced (Pro), the UE can measure a cell (or frequency) of other RATs (i.e., WLAN and NG System). The measurement target is radio wave environments, namely, radio quality and communication quality. In the case of LTE/LTE-Advanced (Pro), the measurement object may include RSRP (Reference Signal Received Power), RSRQ (Reference Signal Received Quality), CSI (Channel State Information), RSSI (Received Signal Strength Indicator), SINR (Signal to Interference plus Noise power Ratio), etc. The radio communication terminal 40 reports a measurement result to the first radio access apparatus 31 (Measurement Report). The measurement result includes a measurement result of a cell managed by the second radio access apparatus 32.

When the measurement result of a cell managed by the second radio access apparatus 32 is equal to or exceeds a predetermined threshold and it is determined to perform inter radio access apparatus interworking (e.g. DC, LWA, LTE NG Tight Interworking) with the second radio access apparatus 32, the first radio access apparatus 31 performs step 1604.

In step 1604, the first radio access apparatus 31 selects a communication path based on the service characteristic information and the backhaul characteristic information stored in the memory 3105. More specifically, by referencing to information in the service characteristic database (401 in FIG. 13) and in the radio communication terminal database (403 in FIG. 17) both stored in the memory 3105, the first radio access apparatus 31 recognizes service requirements (e.g., a QCI, a desired band, an allowable delay, and a desired reliability) corresponding to the service provided to the radio communication terminal 40. Here, it is assumed that the service requirements corresponding to the service A (e.g., a real-time game) provided to the radio communication terminal 40 are as illustrated in FIG. 13B, namely, QCI: "3", a desired band: "large", an allowable delay: "small", and a desired reliability: "large".

Next, the first radio access apparatus 31 recognizes the characteristic of the backhaul corresponding to the communication path types by referencing to the radio access apparatus database (404 in FIG. 18), the communication path type database (402 in FIG. 14), and the backhaul characteristic database (405 in FIG. 19). In this example, as illustrated in FIG. 19, the characteristics of the backhaul 52 (FIG. 7) between the second radio access apparatus 32 and the second core network node 20 are worse than those of the other backhauls. Thus, the first radio access apparatus 31 recognizes that the characteristics of the first, third, and fourth communication paths which do not go through the backhaul 52 (FIG. 7) are better. Furthermore, since the desired band corresponding to the service A provided to the radio communication terminal 40 is "large" or the corresponding QCI is "3", the first radio access apparatus 31 determines that a larger band need to be ensured and selects the third communication path for the radio communication terminal 40.

Next, in step 1605 of the procedure 1600, the first radio access apparatus 31 transmits a request message for preparation of inter radio access apparatus interworking (e.g., an SeNB Addition Request) including the determined third communication path type to the second radio access apparatus 32. In step 1606, the second radio access apparatus 32 transmits a acknowledge message indicating completion of preparation of interworking between different radio access apparatuses (e.g., an SeNB Addition Request Acknowledge) to the first radio access apparatus 31.

In step 1607, the first radio access apparatus 31 notifies the radio communication terminal 40 of the determined third communication path type by using a radio connection re-configuration message (e.g., an RRC Connection Reconfiguration). In the case of LTE/LTE-Advanced (Pro), the first radio access apparatus 31 notifies the radio communication terminal 40 of the determined third communication path type by including the third communication path type (i.e., the Split bearer type) into the RRC Connection Reconfiguration and transmitting it. Alternatively, the first radio access apparatus 31 may notify the radio communication terminal 40 of the determined third communication path type by setting a DRB-ID included in DRB configuration information (i.e., drb-ToAddModListSCG) for the second radio access apparatus 32 (i.e., the SeNB) which is included in an RRC Connection Reconfiguration, to the same DRB-ID of the DRB already configured in the radio communication terminal 40 (i.e., the UE).

In step 1608, the radio communication terminal 40 transmits a radio connection re-configuration completion message (e.g., RRC Connection Reconfiguration Complete) to the first radio access apparatus 31. In step 1609, the first radio access apparatus 31 transmits a re-configuration completion message (e.g., SeNB Reconfiguration Complete) to the second radio access apparatus 32.

In step 1610, an initial access procedure (e.g., Random Access Procedure) is performed between the radio communication terminal 40 and the second radio access apparatus 32. Next, in step 1611, a communication path update procedure (e.g., Path Update Procedure) is performed between the first radio access apparatus 31 and the first core network node 10.

Next, in step 1612, user data forwarded from the second core network node 20 arrives at the first radio access apparatus 31, and part of the user data is transmitted from the first radio access apparatus 31 to the radio communication terminal 40. Meanwhile, the rest of the user data is forwarded to the second radio access apparatus 32 (step 1613). And then, the rest of the user data forwarded is transmitted from the second radio access apparatus 32 to the radio communication terminal 40 (step 1614).

Instead of the first radio access apparatus 31, the second radio access apparatus 32 may perform the processing in step 1604. Namely, the second radio access apparatus 32, which has received the preparation request for inter radio access apparatus interworking in step 1605, may perform the processing in step 1604 upon reception of the preparation request. Thus, to perform the processing in step 1604, the preparation request may include the service characteristic information and the backhaul characteristic information. Furthermore, the completion message of preparation for inter radio access apparatus in step 1606 may include the determined communication path type.

In the present embodiment, the backhaul characteristic information is also taken into consideration in addition to the service characteristic information, and these items of information are compared with each other, when a communication path is selected. Thus, even in a communication system that uses backhauls configured by various networks, a communication path type that is able to satisfy a communication requirement(s) (service requirement(s)) needed to realize a service provided to a communication terminal can be selected.

Third Embodiment

In the present embodiment, a specific example in which DC in LTE and LTE-Advanced (Pro) is applied to the communication system according to the above plurality of embodiments will be described.

Figure 1:
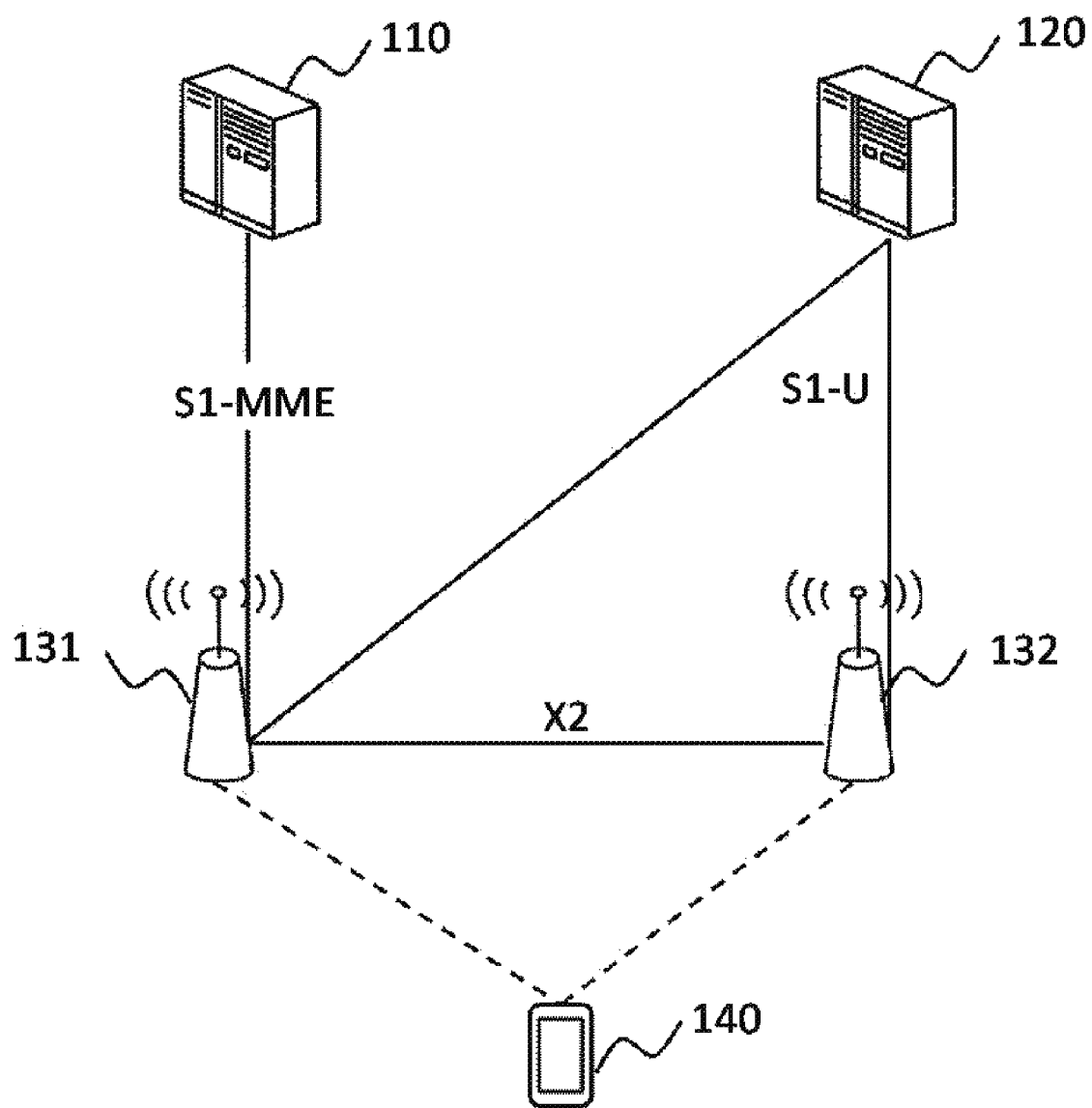
FIG. 1 is a diagram illustrating a configuration example of a communication system according to Dual Connectivity of LTE-Advanced (Pro).
Figure 2:
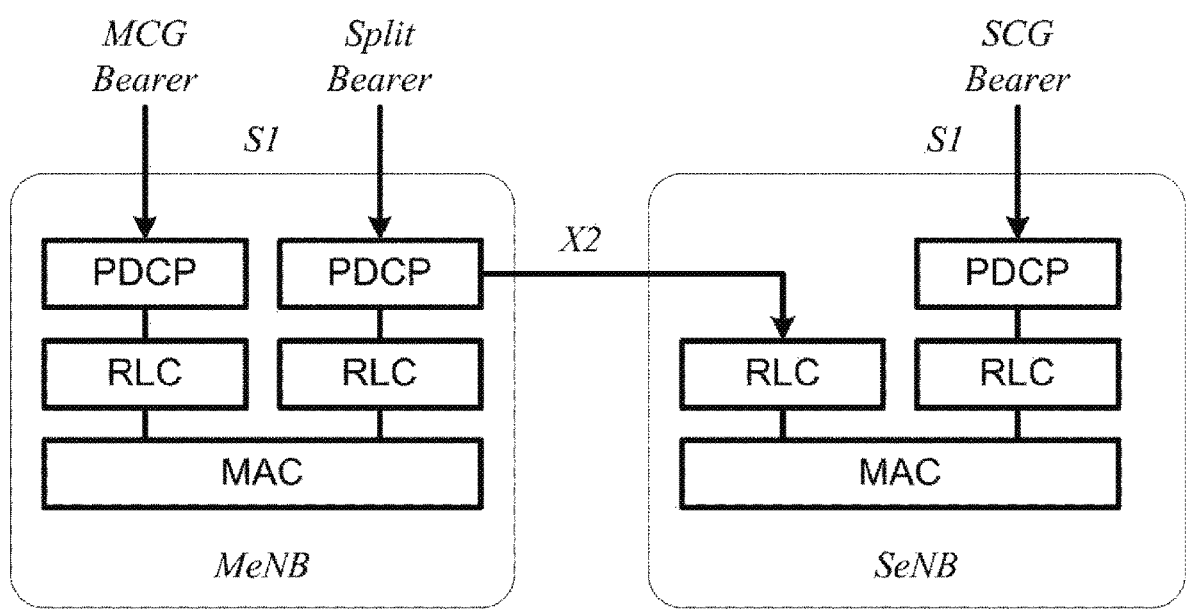
FIG. 2 is a diagram illustrating examples of bearer options according to Dual Connectivity of LTE-Advanced (Pro).

Since the architecture of the communication system according to the present embodiment is the same as that in FIG. 1, description thereof will be omitted.

[Description of Operation]

Figure 20:
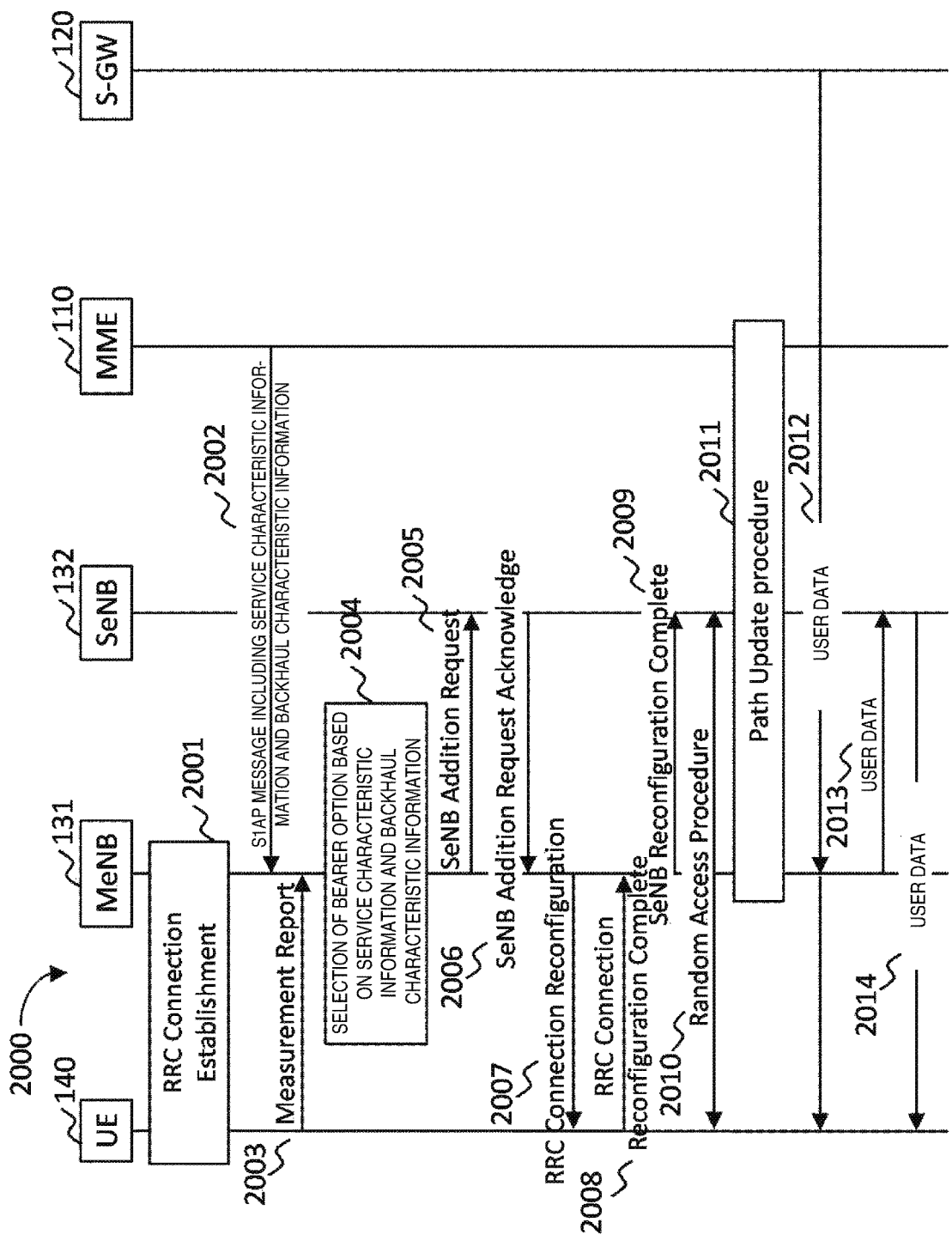
FIG. 20 is a sequence diagram illustrating an example of an overall procedure of a communication system according to a third example embodiment.

FIG. 20 is a procedure (procedure 2000) illustrating an example of an overall operation of the communication system according to the present embodiment.

In step 2001, the UE 140 establishes an RRC Connection in a cell managed by the MeNB 131. The UE 140 establishes the RRC Connection by performing a Random Access Procedure and an RRC Connection Establishment Procedure between the UE 140 and the MeNB 131.

In step 2002, the MeNB 131 receives an S1AP message including service characteristic information and backhaul characteristic information from the MME 110. In this example, the MeNB 131 receives an INITIAL CONTEXT SETUP REQUEST as an example of an S1AP message, but the S1AP message is not limited to this example. For example, the MeNB 131 may receive a DOWNLINK NAS TRANSPORT.

The MeNB 131 may receive the service characteristic information from the UE 140, instead of from the MME 110. For example, the service characteristic information may be included in a UE Information Response message transmitted from the UE 140 to the MeNB 131.

Alternatively, the MeNB 131 may receive the backhaul characteristic information in an S1 setup procedure between the MeNB 131 and the MME 110 or in an X2 setup procedure between the MeNB 131 and the SeNB 132. Namely, the backhaul characteristic information about a backhaul to which the SeNB 132 connects may be included in an S1 Setup Response message transmitted from the MME 110 to the MeNB 131 or an X2 Setup Response message transmitted from the SeNB 132 to the MeNB 131.

Next, in step 2002, the MeNB 131 stores the received service characteristic information and backhaul characteristic information in a memory of the MeNB 131.

In step 2003, the MeNB 131 receives a Measurement Report from the UE 140. More specifically, the MeNB 131 transmits an RRC Connection Reconfiguration message including Meas-Config IE to the UE 140. After receiving the RRC Connection Reconfiguration message, the UE 140 performs measurement based on the Meas-Config IE included in the message. The measurement includes Neighbor cell measurement, namely, measurement on a cell managed by the SeNB 132. Next, the UE 140 transmits, to the MeNB 131, the Measurement Report including the measurement result (e.g., RSRP, RSRQ, CSI, RSSI, SINR).

In step 2004, from among the Dual Connectivity bearer options (i.e., MCG bearer, SCG bearer, and Split bearer) supported by the MeNB 131 and the SeNB 132, the MeNB 131 determines a bearer type applied to the UE 140, based on the service characteristic information and the backhaul characteristic information stored in the memory. Since the bearer type is determined in the same way as described in step 1604 of the procedure 1600 according to the second example embodiment, description thereof will be omitted. This example assumes that the MeNB 131 has determined the Split bearer for the UE 140.

Next, in step 2005, the MeNB 131 transmits an SeNB Addition Request message including information about the determined Split bearer to the SeNB 132. In step 2006, the SeNB 132 transmits an SeNB Addition Request Acknowledge message to the MeNB 131.

In step 2007, the MeNB 131 notifies the UE 140 of the determined bearer type (i.e., Split bearer) by using an RRC Connection Reconfiguration message. The MeNB 131 may notify the UE 140 of the determined bearer type by including the Split bearer type into an RRC Connection Reconfiguration message and transmitting the RRC Connection Reconfiguration message. Alternatively, the MeNB 131 may notify the UE 140 of the determined bearer type by setting a DRB-ID in DRB configuration information (i.e., drb-ToAddModListSCG) for the SeNB 132 which is included in an RRC Connection Reconfiguration message, to the same DRB-ID in the DRB already configured in the UE 140. Furthermore, configuration information (i.e., SCG Configuration) about the SeNB 132 may be included in the RRC Connection Reconfiguration message.

In step 2008, the UE 140 transmits an RRC Connection Reconfiguration Complete message to the MeNB 131.

In step 2009, the MeNB 131 transmits an SeNB Reconfiguration Complete message to the SeNB 132.

In step 2010, a Random Access Procedure is performed between the UE 140 and the SeNB 132. Next, in step 2011, a Path Update Procedure is performed between the MeNB 131 and the MME 110.

Next, in step 2012, user data forwarded from the S-GW 120 arrives at the MeNB 131, and part of the user data is transmitted from the MeNB 131 to the UE 140. Meanwhile, the rest of the user data is forwarded to the SeNB 132 (step 2013), and the rest of the user data forwarded is transmitted from the SeNB 132 to the UE 140 (step 2014).

Instead of the MeNB 131, the SeNB 132 may perform the processing in step 2004. Namely, after receiving the SeNB Addition Request in step 2005, the SeNB 132 may perform the processing in step 2004 upon reception of the SeNB Addition Request. Thus, to perform the processing in step 2004, the service characteristic information and the backhaul characteristic information may be included in the SeNB Addition Request. In addition, the determined bearer type may be included in the SeNB Addition Request Acknowledge in step 2006.

Fourth Embodiment

In the present example embodiment, a specific example in which the LWA in LTE and LTE-Advanced (Pro) is applied to the communication system according to the above plurality of example embodiments will be described.

Figure 3:
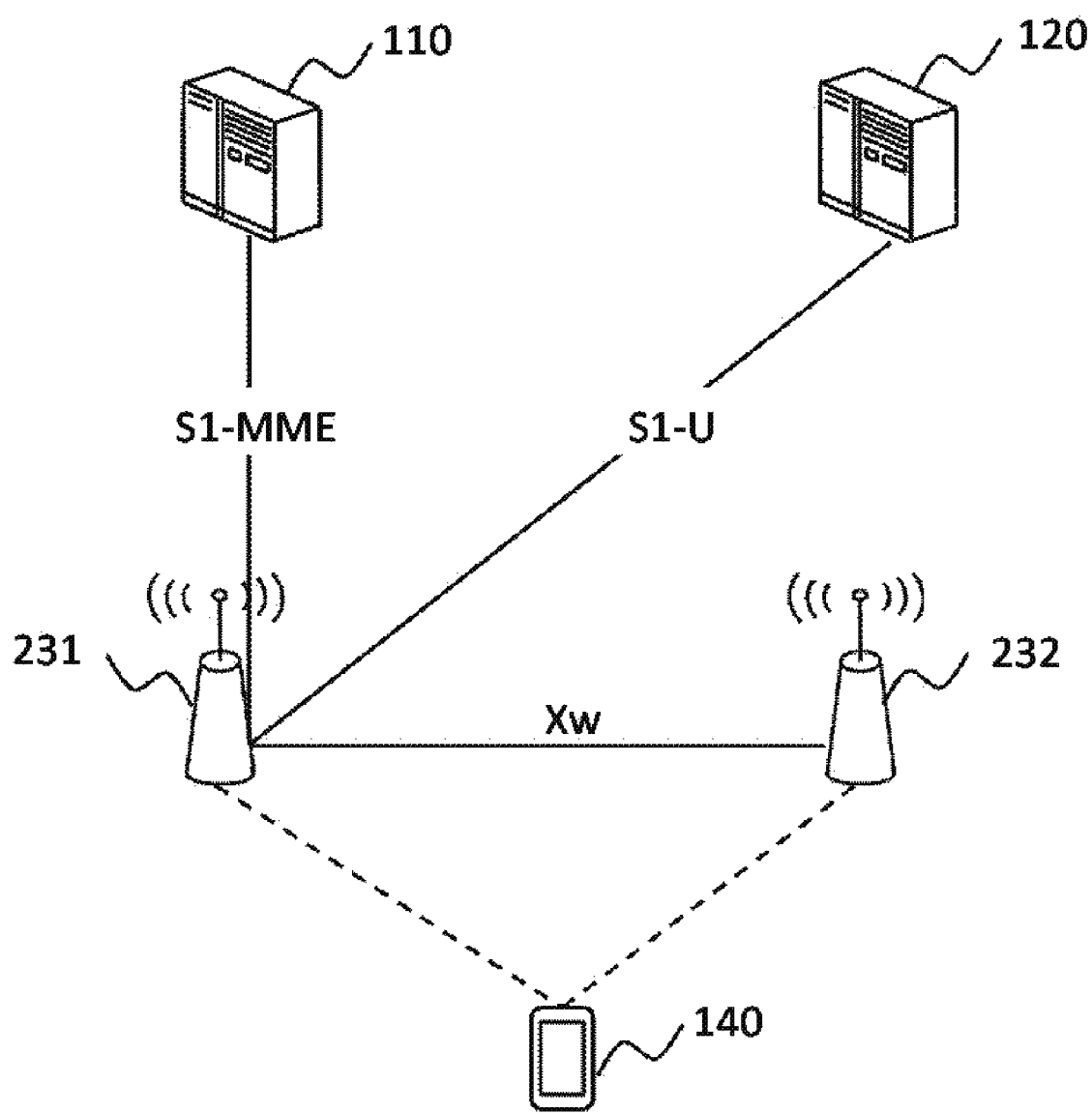
FIG. 3 is a diagram illustrating a configuration example of a communication system according to LWA of LTE-Advanced (Pro).
Figure 4A:
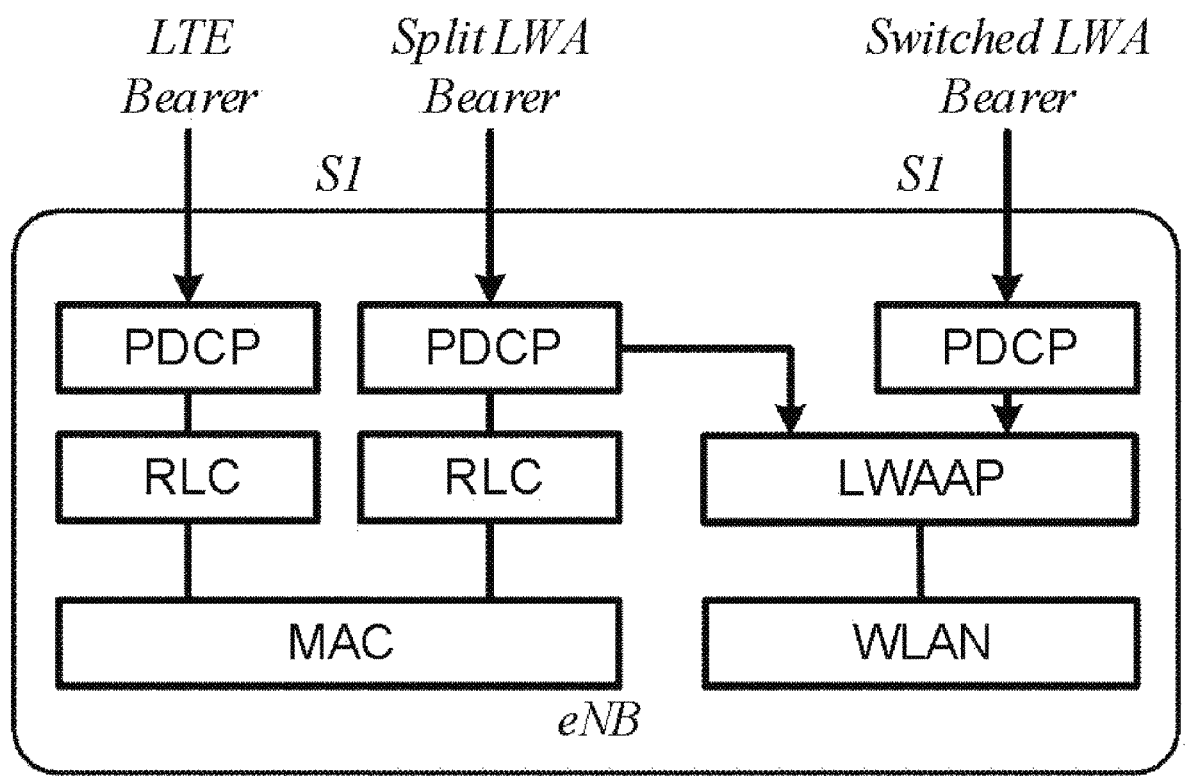
FIG. 4A is a diagram illustrating examples of bearer options according to LWA of LTE-Advanced (Pro).
Figure 4B:
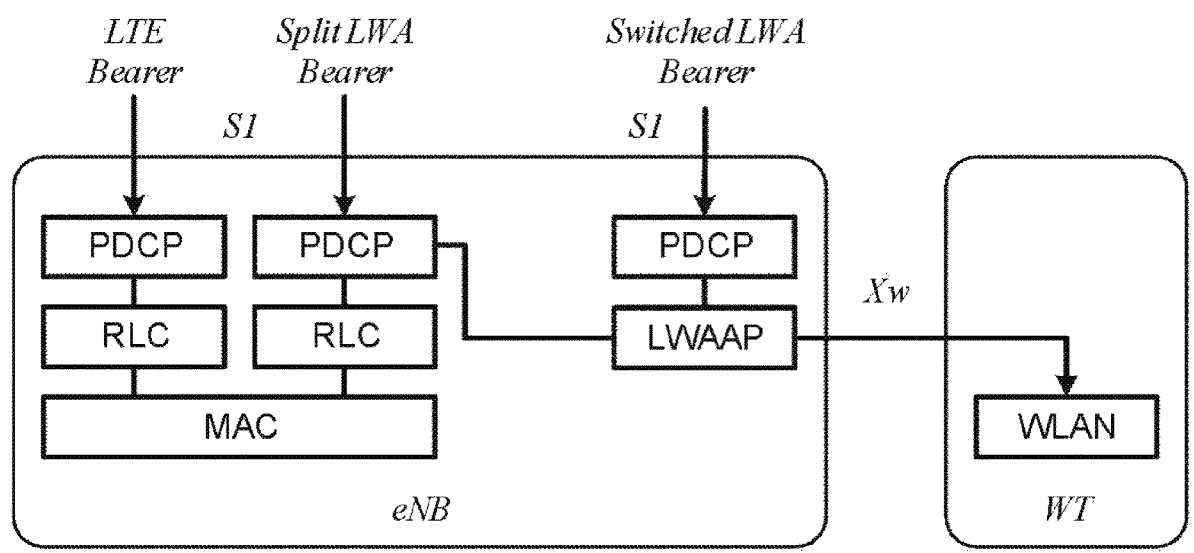
FIG. 4B is a diagram illustrating other examples of bearer options according to LWA of LTE-Advanced (Pro).

Since the architecture of the communication system according to the present embodiment is the same as that in FIG. 3, description thereof will be omitted.

[Description of Operation]

Figure 21:
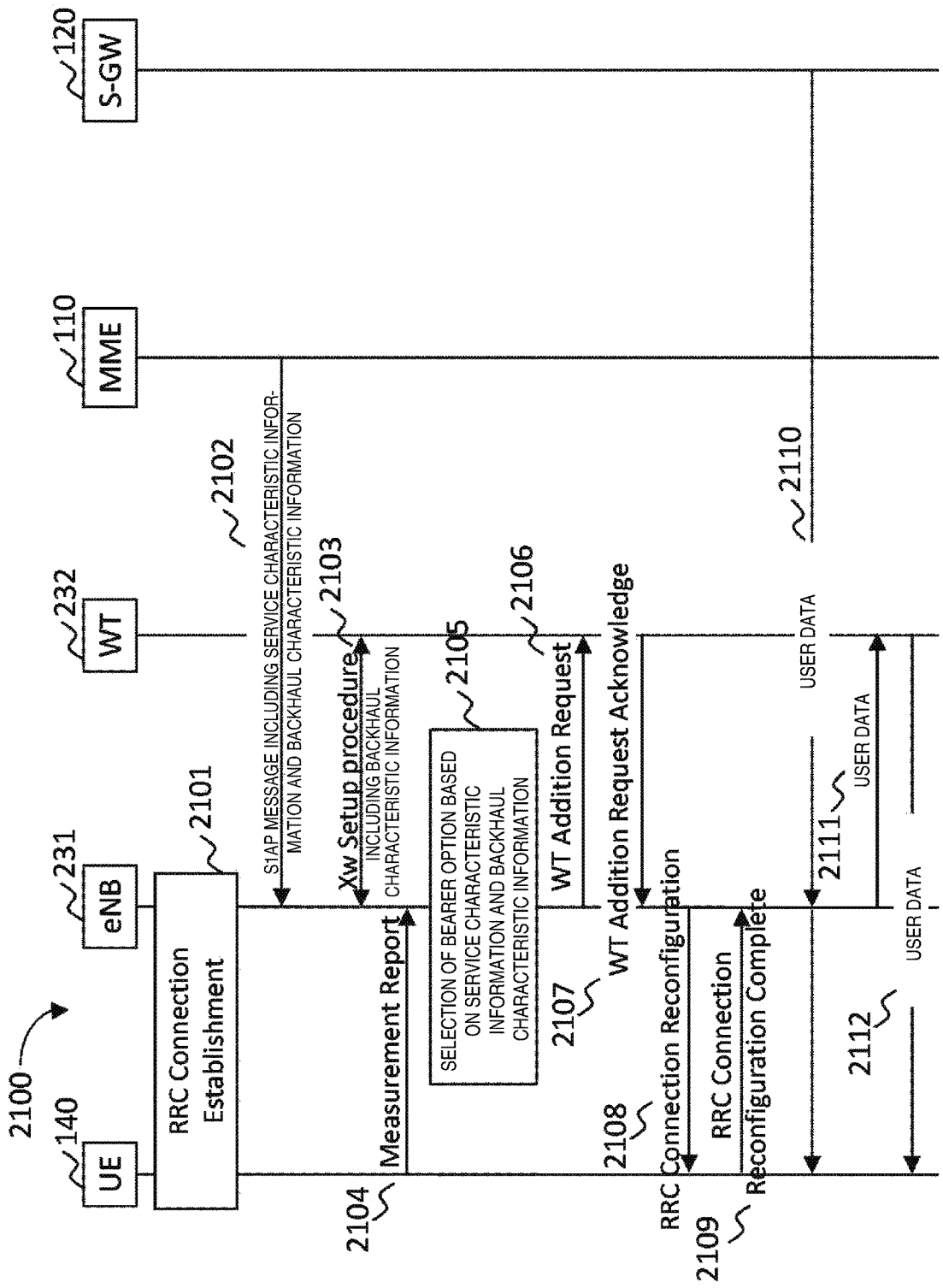
FIG. 21 is a sequence diagram illustrating an example of an overall procedure of a communication system according to a fourth example embodiment.

FIG. 21 is a procedure (procedure 2100) illustrating an example of an overall operation of the communication system according to the present embodiment.

The operations in steps 2101 and 2102 are the same as those in steps 2001 and 2002 in the procedure 2000, description thereof will be omitted.

Next, in step 2103, the eNB 231 receives backhaul characteristic information about a backhaul(s) to which the WT 232 connects, from the WT 232, via an XwAP (Xw Application Protocol) message (e.g., Xw setup procedure message). Namely, the backhaul characteristic information about the backhaul(s) to which the WT 232 connects may be included in an Xw Setup Response message which is transmitted from the WT 232 to the eNB 231. The backhaul to which the WT 232 connects includes not only a backhaul between the WT 232 and the eNB 231, but also a backhaul between the WT 232 and an upper network node of the WT 232.

In step 2104, the eNB 231 receives a Measurement Report from the UE 140. More specifically, the eNB 231 transmits an RRC Connection Reconfiguration message including Meas-Config IE to the UE 140. The Meas-Config IE includes a measurement target WLAN ID (e.g., BSSID (Basic Service Set Identifier), HESSID (Homogenous Extended Service Set Identifier), and SSID (Service Set Identifier)). After receiving the RRC Connection Reconfiguration message, the UE 140 performs WLAN measurement, based on the WLAN ID in the Meas-Config IE included in the message. Next, the UE 140 transmits a measurement result to the eNB 231.

In step 2105, among the LTE-WLAN Aggregation bearer options supported by the eNB 231 and the WT 232 (i.e., LTE bearer, Split LWA bearer, and Switched LWA bearer), the eNB 231 determines a bearer type applied to the UE 140, based on the service characteristic information and the backhaul characteristic information stored in a memory of the eNB 231. Since the eNB 231 determines the bearer type in the same way as in step 1604 in the procedure 1600 according to the second embodiment, description thereof will be omitted. Here, it is assumed that the eNB 231 has selected the Split LWA bearer for the UE 140.

Next, in step 2106, the eNB 231 transmits a WT Addition Request message to the WT 232. The WT Addition Request message may include information that indicates the determined bearer type (i.e., Split LWA bearer). In step 2107, the WT 232 transmits a WT Addition Request Acknowledge message to the eNB 231.

In step 2108, the eNB 231 notifies the UE 140 of the determined bearer type (i.e., Split LWA bearer) by using an RRC Connection Reconfiguration message. The eNB 231 may notify the UE 140 of the determined bearer type by including the Split LWA bearer type into the RRC Connection Reconfiguration and transmitting the RRC Connection Reconfiguration. Configuration information about the WT 232 (i.e., LWA Configuration) may be included in the RRC Connection Reconfiguration message.

In step 2109, the UE 140 transmits an RRC Connection Reconfiguration Complete to the eNB 231.

Next, in step 2110, user data forwarded from the S-GW 120 arrives at the eNB 231, and a part of the user data is transmitted from the eNB 231 to the UE 140. Meanwhile, the rest of the user data is forwarded to the WT 232 (step 2111), and the rest of the user data forwarded is transmitted from the WT 232 to the UE 140 (step 2112).

Instead of the eNB 231, the WT 232 may perform the processing of step 2105. Namely, after receiving the WT Addition Request in step 2106, the WT 232 may perform the processing of step 2105 upon reception of the WT Addition Request. Thus, to perform the processing of step 2105, the service characteristic information and the backhaul characteristic information may be included in the WT Addition Request. Furthermore, the determined bearer type may be included in the WT Addition Request Acknowledge in step 2107.

In the present embodiment, the eNB 231 receives the backhaul characteristic information about the WT 232 in a WLAN, which is a RAT different from the LTE, from the WT 232. Next, the eNB 231 selects a bearer type based on the backhaul characteristic information among the nodes, which includes the backhaul characteristic information about the WT 232, and the service characteristic information. Thus, the bearer type can be selected in view of the backhaul characteristic information about the different RAT.

Fifth Embodiment

In the present embodiment, a specific example in which the LTE-NG Tight Interworking is applied to the communication system according to the plurality of embodiments will be described.

Figure 5:
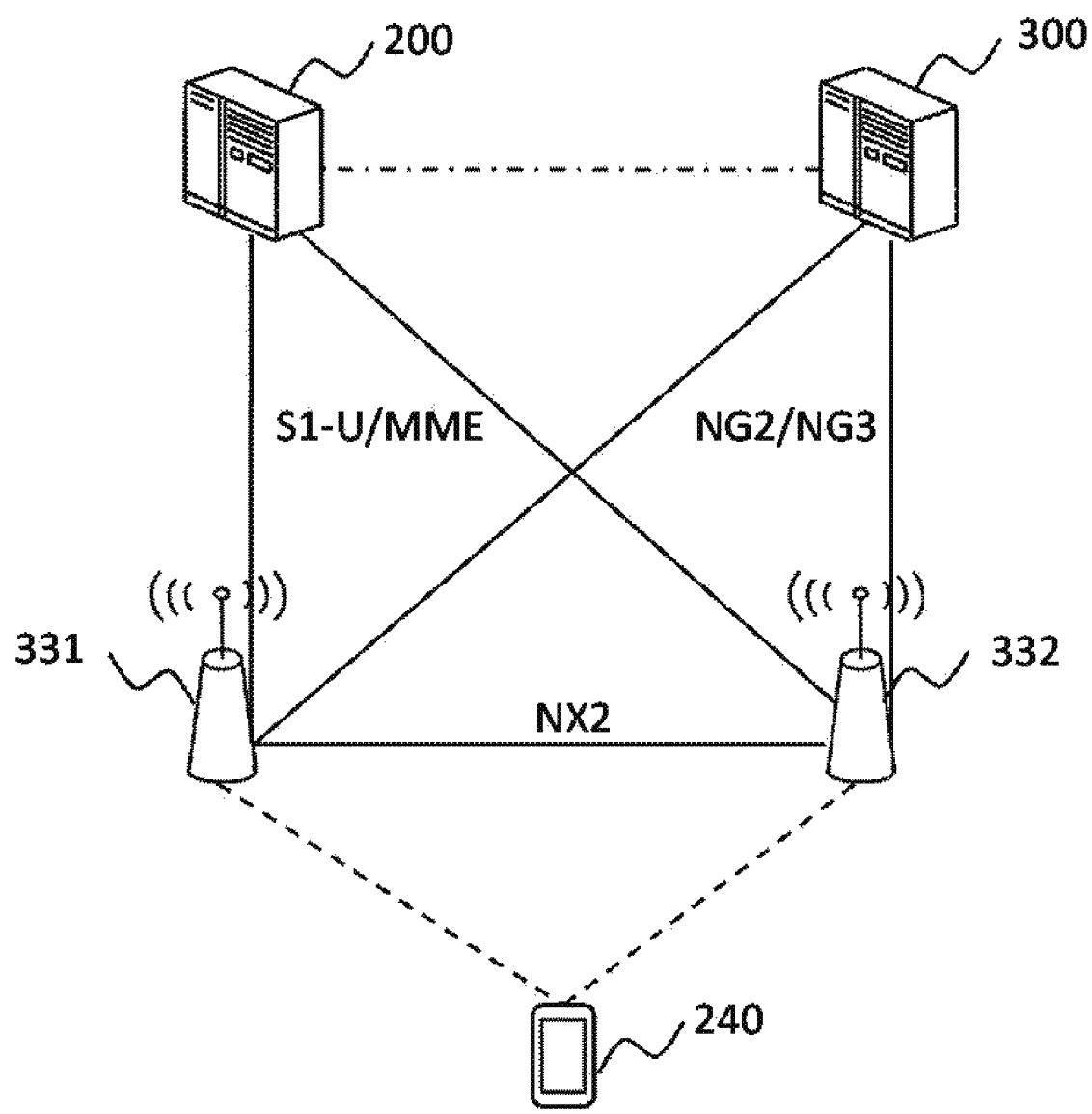
FIG. 5 is a diagram illustrating a configuration example of a communication system according to LTE-NG Tight Interworking.
Figure 6:
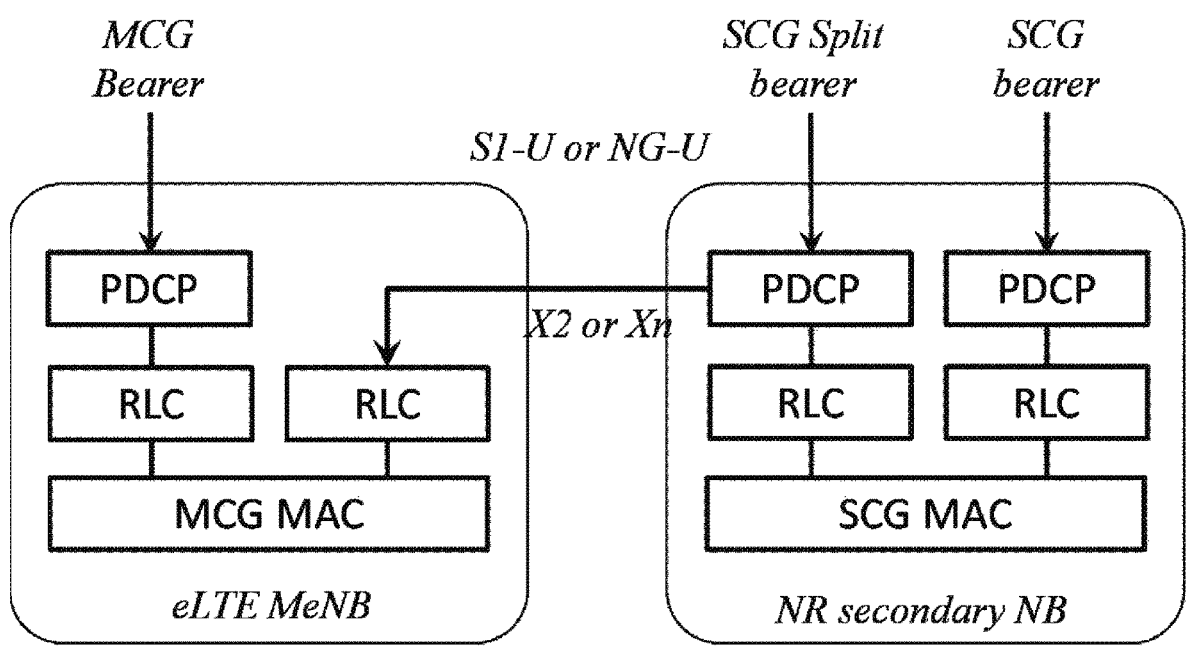
FIG. 6 is a diagram illustrating examples of bearer options according to LTE-NG Tight Interworking.

The architecture of the communication system according to the present embodiment is the same as that in FIG. 5. However, in the present embodiment, it is assumed that the eLTE eNB 331 and the NR NB 332 are connected to at least the NG Core node 300. The NG Core node 300 includes an NG Core CPF (C-Plane Function) node 310 and an NG Core UPF (U-Plane Function) node 320.

[Description of Operation]

Figure 22:
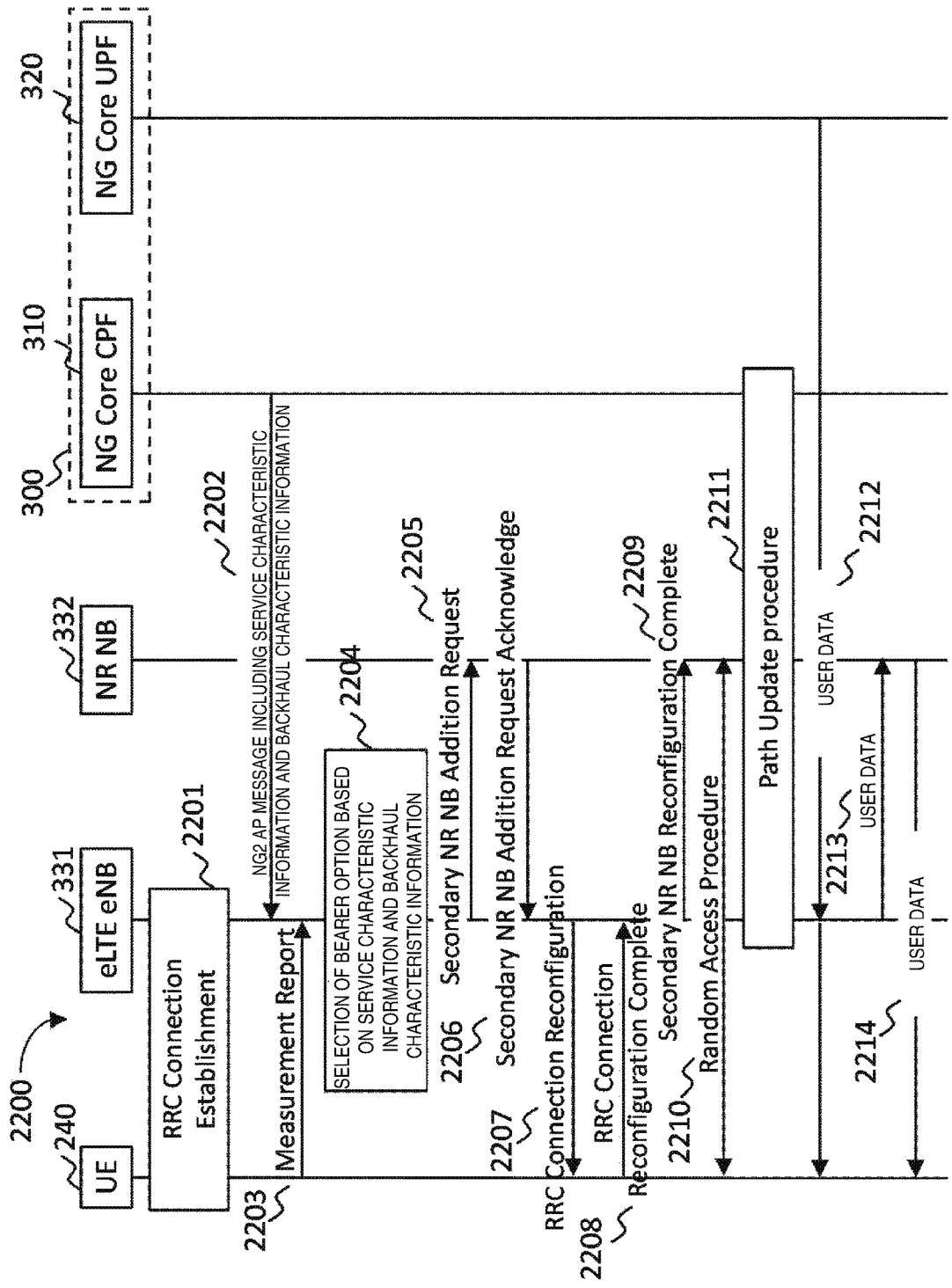
FIG. 22 is a sequence diagram illustrating an example of an overall procedure of a communication system according to a fifth example embodiment.

FIG. 22 is a procedure (procedure 2200) illustrating an overall operation of the communication system according to the present embodiment.

In step 2201, the NG UE 240 establishes an RRC Connection in a cell managed by the eLTE eNB 331. The NG UE 240 establishes the RRC Connection by performing a Random Access Procedure and an RRC Connection Establishment Procedure between the NG UE 240 and the eLTE eNB 331.

In step 2202, the eLTE eNB 331 receives an NG2AP (NG2 Application Protocol) message including service characteristic information and backhaul characteristic information from the NG Core CPF node 310. This NG2AP message may be a message that relates to setup of a UE Context, such as an INITIAL CONTEXT SETUP REQUEST in an S1AP message. Alternatively, the NG2AP message may be a message for forwarding messages transmitted on a layer or an interface (e.g., NG1) terminated between the NG UE 240 and the NG Core CPF node 310, such as a DOWNLINK NAS TRANSPORT in an S1AP message.

In step 2203, the eLTE eNB 331 receives a Measurement Report from the NG UE 240. More specifically, the eLTE eNB 331 transmits an RRC Connection Reconfiguration message including Meas-Config IE to the NG UE 240. The Meas-Config IE includes measurement configuration information for measuring a cell(s) managed by the NR NB 332. After receiving the RRC Connection Reconfiguration message, the NG UE 240 performs measurement (Inter-RAT Measurement) of the cell(s) managed by the NR NB, based on the Meas-Config IE included in the message. Next, the NG UE 240 transmits the measurement result to the eLTE eNB 331.

Alternatively, the eLTE eNB 331 may receive the backhaul characteristic information by performing an NG2 interface setup procedure with the NG Core CPF node 310 or an NX2 (Xn) interface setup procedure with the NR NB 332.

In step 2204, from among the bearer options (i.e., MCG bearer, SCG bearer, MCG Split bearer, and SCG Split bearer) of the LTE-NG Tight Interworking supported by the eLTE eNB 331 and the NR NB 332, the eLTE eNB 331 determines a bearer type applied to the NG UE 240, based on the service characteristic information and the backhaul characteristic information stored in a memory. Since the eLTE eNB 331 determines a bearer type in the same way as in step 1604 of the procedure 1600 according to the second example embodiment, description thereof will be omitted. Here, it is assumed that the eLTE eNB 331 has selected the MCG Split bearer for the UE 140.

Next, in step 2205, the eLTE eNB 331 transmits a Secondary NR NB Addition Request message including information about the determined MCG Split bearer to the NR NB 332. In step 2206, the NR NB 332 transmits a Secondary NR NB Addition Request Acknowledge message to the eLTE eNB 331.

In step 2207, the eLTE eNB 331 notifies the NG UE 240 of the determined bearer type (i.e., the MCG Split bearer) by using an RRC Connection Reconfiguration message. The eLTE eNB 331 notifies the NG UE 240 of the determined bearer type by including the MCG Split bearer type into the RRC Connection Reconfiguration and transmitting the RRC Connection Reconfiguration. The RRC Connection Reconfiguration message may include configuration information about the NR NB 332 (i.e., SCG Configuration).

In step 2208, the NG UE 240 transmits an RRC Connection Reconfiguration Complete to the eLTE eNB 331.

In step 2209, the eLTE eNB 331 transmit Secondary NR NB Reconfiguration Complete to the NR NB 332.

In step 2210, a Random Access Procedure is performed between the NG UE 240 and the NR NB 332. Next, in step 2211, a Path Update Procedure is performed between the eLTE eNB 331 and the NG Core CPF node 310.

Next, in step 2212, user data forwarded from the NG Core UPF node 320 arrives at the eLTE eNB 331, and part of the user data is transmitted from the eLTE eNB 331 to the NG UE 240. The rest of the user data is forwarded to the NR NB 332 (step 2213), and the rest of the user data forwarded is transmitted from the NR NB 332 to the NG UE 240 (step 2214).

A core network node to which the eLTE eNB 331 and the NR NB 332 connected may be the eEPC node 200.

An anchor node in the LTE-NG Tight Interworking may be the NR NB 332. Namely, the operation of the eLTE eNB 331 in the operation of the procedure 2200 may be performed by the NR NB 332, and the operation of the NR NB 332 in the procedure 2200 may be performed by the eLTE eNB 331.

Alternatively, instead of the eLTE eNB 331, the NR NB 332 may perform the processing in step 2204 of the procedure 2200. Namely, the NR NB 332, which has received the Secondary NR NB Addition Request in step 2205, may perform the processing in step 2204 upon reception of the Secondary NR NB Addition Request. Thus, to perform the processing in step 2204, the Secondary NR NB Addition Request may include the service characteristic information and the backhaul characteristic information. The Secondary NR NB Addition Request Acknowledge in step 2206 may include the determined bearer type.

Alternatively, instead of the eLTE eNB, the NR NB may be used in the procedure 2200 according to the present embodiment. Namely, a plurality of NR NBs may perform the procedure 2200.

In the present embodiment, the eLTE eNB 331 receives the backhaul characteristic information about the NR NB 332 in the NG System, which is a RAT different from the LTE, from the NR NB 332. Next, the eLTE eNB 331 selects a bearer type, based on the backhaul characteristic information among the nodes, which includes the backhaul characteristic information about the NR NB 332, and the service characteristic information. Thus, the eLTE eNB 331 can select a bearer type in view of the characteristics information about a backhaul(s) in a different RAT(s).

Other Embodiments

The present disclosure is not limited to the architectures and operations according to the above described embodiments.

For example, in the communication system according to the plurality of embodiments, a backhaul characteristic information management node may be included in a core network or an upper network thereof. The backhaul characteristic information management node is a control node that manages backhaul characteristic information, a node(s) connected to a backhaul(s), and a backhaul connection point(s) and transmits backhaul characteristic information in response to a request from a different node(s).

The backhaul characteristic information management node may be the first or second core network node 10 or 20. In addition, the backhaul characteristic information management node may be referred to as an SDN (Software-Defined Network) controller.

Figure 23:
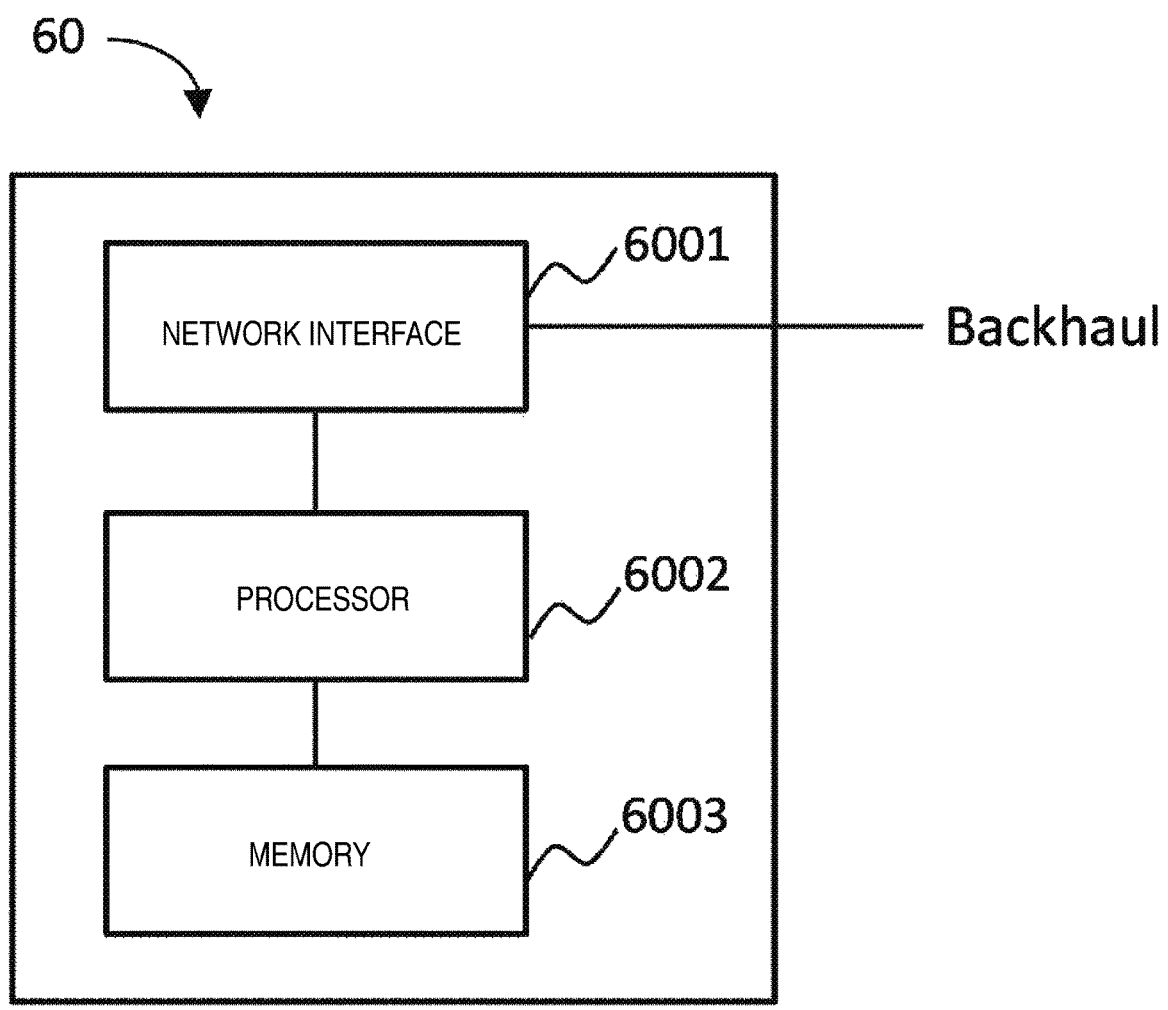
FIG. 23 is a block diagram illustrating a configuration example of a backhaul characteristic information management node according to another example embodiment.

FIG. 23 is a block diagram illustrating a configuration of a backhaul characteristic information management node 60 according to a plurality of embodiments. As illustrated in FIG. 23, the backhaul characteristic information management node includes a network interface 6001, a processor 6002, and a memory 6003.

The network interface 6001 is used for communication with other core network nodes (e.g., MME, S-GW, NG Core CPF, and NG Core UPF) and other radio access apparatuses (e.g., eNBs (MeNB, SeNB, and eLTE eNB), WT, and NR NB). The network interface 6001 may include, for example, a network interface card (NIC) that complies with the IEEE 802.3 series.

For example, the processor 6002 may be a microprocessor, an MPU, or a CPU. The processor 6002 may include a plurality of processors.

The memory 6003 is configured by a combination of a volatile memory and a non-volatile memory. For example, the volatile memory is an SRAM, a DRAM, or a combination thereof. For example, the non-volatile memory is an MROM, a PROM, a flash memory, a hard disk drive, or a combination thereof. The memory 6003 may include a storage arranged separately from the processor 6002. In this case, the processor 6002 may access the memory 6003 via the network interface 6001 or an I/O interface not illustrated.

The backhaul characteristic database according to the above plurality of embodiments is stored in the memory 6003. In addition, a database in which a node and a backhaul domain type are held in association with each other may be stored in the memory 6003. This database includes the radio access apparatus database according to the above plurality of embodiments.

In addition, the memory 6003 may hold a software module(s) (a computer program(s)) including instructions and data for performing processing of the backhaul characteristic information management node 60 illustrated in FIG. 24 described below. In some implementations, the processor 6002 may be configured to perform the processing of the backhaul characteristic information management node 60 illustrated in FIG. 24 described below by reading the software module(s) from the memory 6003 and executing the read software module(s).

Figure 24:
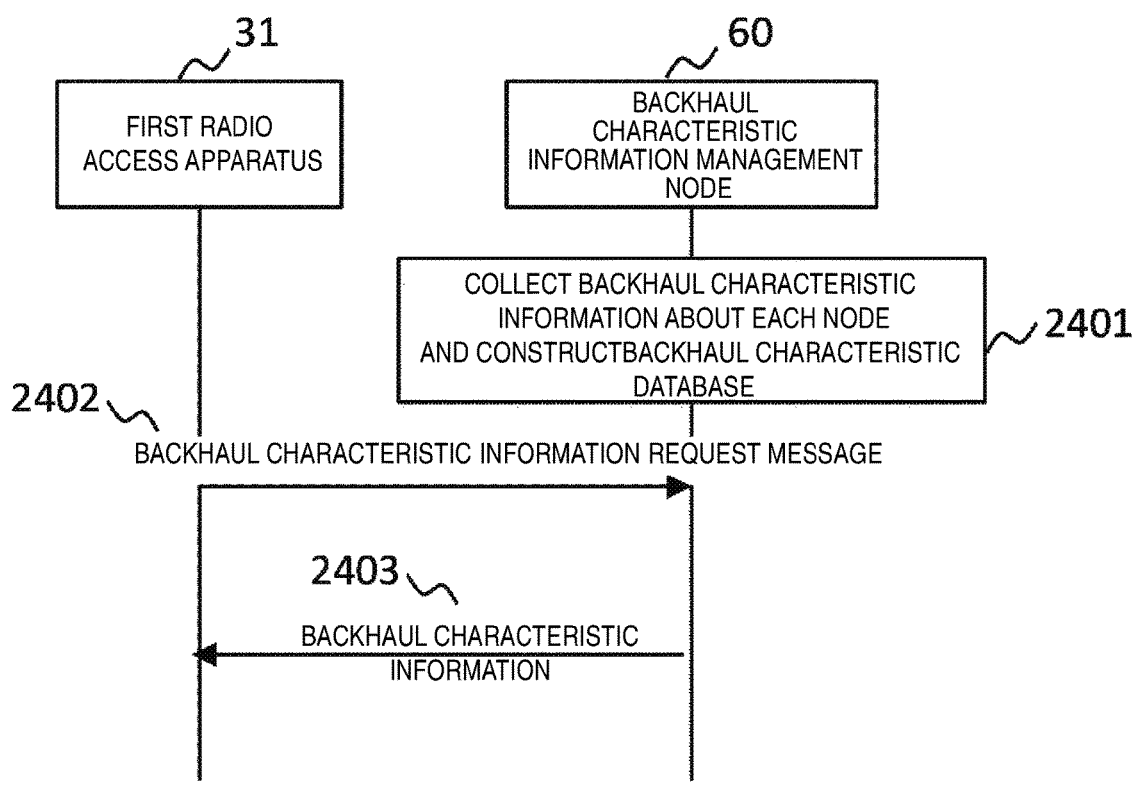
FIG. 24 is a sequence diagram illustrating an example of a procedure between the backhaul characteristic information management node and a first radio access apparatus according to another example embodiment.

FIG. 24 is a diagram illustrating a procedure (a procedure 2400) of an example of an operation between the backhaul characteristic information management node 60 and the first radio access apparatus 31 (e.g., MeNB 131, eNB 231, or eLTE eNB 331). The procedure 2400 may be performed in place of step 1602 in the procedure 1600, step 2002 in the procedure 2000, step 2102 in the procedure 2100, or step 2202 in procedure 2200 or in addition to any one of these steps.

In step 2401, the backhaul characteristic information management node 60 collects backhaul characteristic information about each node (e.g., first and second radio access apparatuses 31 and 32, first and second core network nodes 10 and 20) and establishes the backhaul characteristic database (405 in FIG. 19). When each node is installed in a network or an interface between nodes is set up, the backhaul characteristic information management node 60 may collect the backhaul characteristic information by transmitting a request to each node. Alternatively, the collection of the backhaul characteristic information may be performed based on data inputted by an operator.

In step 2402, the first radio access apparatus 31 transmits a backhaul characteristic information request message to the backhaul characteristic information management node 60. This request message may include identification information about a node to which a request target backhaul is connected.

In step 2403, in response to the received request message, the backhaul characteristic information management node 60 transmits the corresponding backhaul characteristic information to the first radio access apparatus 31.

Next, the first radio access apparatus 31 performs communication path determination processing (determination of a bearer type) according to the above plurality of example embodiments, based on the received backhaul characteristic information.

Since the first radio access apparatus 31 acquires the backhaul characteristic information about each of the nodes collectively from the backhaul characteristic information management node 60, the first radio access apparatus 31 does not need to collect the backhaul characteristic information from each node individually. This can contribute to reduction of resource utilization of the radio access apparatuses.

Instead of the backhaul characteristic information (the backhaul characteristic database) according to the above plurality of embodiments, path characteristics information (a path characteristics database) may be used to determine the communication path.

FIG. 25 is a diagram illustrating an example of a path characteristics database 406. The path characteristics database 406 holds, identification information of nodes, which are endpoints of a path, and characteristics of the path (available band, delay, and reliability) in association with each other. In the case of LTE/LTE-Advanced (Pro), a path endpoint may be at least one of a GTP Tunnel TEID and a Transport Layer Address.

The determination of a communication path (selection of a bearer type) according to the plurality of embodiments may be performed upon reception of a Handover Request from another radio access apparatus.

For example, in the case of DC in LTE/LTE-Advanced (Pro), in a procedure of an Inter-MeNB handover without SeNB change, the MeNB 131 as a handover destination MeNB (Target MeNB) that has received a Handover Request from a handover source MeNB (Source MeNB) may perform step 2004 of the procedure 2000 according to the second embodiment.

In addition, the determination of the communication path (the selection of the bearer type) according to the above plurality of embodiments may be performed with considering Network slicing that could be supported in the above described NG System.

Network slicing uses Network Function Virtualization (NFV) technology and SDN technology to enable generation of a plurality of virtualized logical networks on a physical network. A virtualized logical network, which is referred to as a network slice or a network slice instance, includes logical nodes and functions, and is used for certain traffic and signaling. This network slicing or network slice instance is expected to be generated per service (use case) provided to a UE.

In this case, when an NR NB in the NG System (For example, the NR NB 332 according to the fifth embodiment) generates a network slice or a network slice instance, a communication path in the above plurality of embodiments may be determined. The determination of the communication path may be based on an ID (Slice ID) of the generated network slice or a network slice instance. The Slice ID may indicate slice instance information (Network Slice Instance (NSI) ID), network information (Dedicated Core Network (DCN) ID), network domain name information (Domain Network Name (DNN) ID), or an arbitrary combination thereof.

Namely, the NR NB may generate a network slice (instance) per service (use case) provided to a UE and determine (select) a communication path (bearer type) corresponding to the generated network slice (instance).

The generation of the network slice (instance) according to the fifth embodiment may be performed upon reception of a Secondary NR NB Addition Request message transmitted from the eLTE eNB 331. Alternatively, the generation of the network slice (instance) on the NG side (e.g., the NR NB or the NG Core node) may be performed upon reception of a HANDOVER REQUEST message transmitted from the LTE side (e.g., the eLTE eNB or the eEPC node) in a case of an Inter-RAT handover from the LTE to the NG system. Alternatively, the generation of the network slice (instance) may be performed upon reception by the NR NB of a radio connection (e.g., Random Access and an RRC Connection Establishment) from the NG UE.

In addition or alternatively, the service characteristic information according to the above plurality of embodiments may be information per radio terminal or information per network bearer. Namely, the determination of the communication path (selection of the bearer type) according to the above plurality of embodiments may be performed based on service characteristic information per radio terminal or service characteristic information per network bearer (i.e., one-to-one mapping between the service characteristic information and the network bearer).

Alternatively, the service characteristic information may be information per flow. Namely, the determination of the communication path (the selection of the bearer type) may be performed per flow, based on service characteristic information per flow. In this case, one or more flows may be mapped to a network bearer.

Furthermore, in addition to the determination of the communication path (selection of the bearer type) according to the above plurality of embodiments, or in place of the determination of the communication path, a determination may be made as to which one of DC, LWA, and LTE-NG Tight Interworking is to be performed based on the service characteristic information and the backhaul characteristic information. Namely, the first radio access apparatus may acquire backhaul characteristic information about a plurality of second radio access apparatuses which are connection destination candidates, as an SeNB, a WT, and an NR NB, and determine which one of DC, LWA, and LTE-NG Tight Interworking is to be performed, based on the backhaul characteristic information and the service characteristic information.

Alternatively, the above embodiments may be performed independently or collectively. Alternatively, a part of the embodiments may be combined as needed and performed.

The above embodiments are only examples of application of the technical idea that has been obtained by the present inventor. Namely, the technical idea is not limited to only the above example embodiments, and of course, various modifications are possible.

The above example embodiments can partially or entirely be described as follows, though not limited thereto.

(Supplementary Note 1)

A communication system, which includes a first radio access apparatus, a second radio access apparatus, and a radio terminal that is enabled to simultaneously communicate with the first radio access apparatus and the second radio access apparatus and in which user data can be transmitted to the radio terminal by using one of a plurality of types of communication paths which go through at least one of the first radio access apparatus and the second radio access apparatus, the communication system including:

a means that acquires service characteristic information that indicates a characteristic of a service provided to the radio terminal; and a means that determines a type of a communication path for downlink user data used for provision of the service to the radio terminal from among the plurality types of communication paths, based on the service characteristic information;

wherein the plurality of types of communication paths includes at least two out of:

a first communication path that goes through only the first radio access apparatus;

a second communication path that goes through only the second radio access apparatus;

a third communication path in which a part of traffic of downlink user data that has arrived at the first radio access apparatus goes through the second radio access apparatus and a remaining part of the traffic goes through the first radio access apparatus;

a fourth communication path in which traffic of downlink user data that has arrived at the first radio access apparatus goes through only the second radio access apparatus;

a fifth communication path in which a part of traffic of downlink user data that has arrived at the second radio access apparatus goes through the first radio access apparatus and a remaining part of the traffic goes through the second radio access apparatus; and a sixth communication path in which traffic of downlink user data that has arrived at the second radio access apparatus goes through only the first radio access apparatus.

(Supplementary Note 2)

The communication system according to supplementary note 1, wherein the service characteristic information includes a service type; and at least one of a QoS (Quality of Service) Class Identifier;

a desired band;

an allowable delay time;

a desired reliability;

a resource type;

a priority level; and a packet error loss rate associated with the at least one service type.

(Supplementary Note 3)

The communication system according to supplementary note 1 or 2;

wherein backhaul characteristic information that indicates a characteristic of backhauls corresponding to the communication paths is also acquired; and wherein the communication path type is determined by comparing the characteristic of the backhaul with the characteristic of the service.

(Supplementary Note 4)

The communication system according to any one of notes 1 to 3;

wherein the radio terminal can simultaneously communicate with the first radio access apparatus and the second radio access apparatus by using one of:

Dual Connectivity;

LWA (LTE (Long Term Evolution)-WLAN (Wireless Local Access Network) Aggregation); and LTE-NG (NextGen) Tight Interworking, wherein the first communication path is an MCG (Master Cell Group) bearer, the second communication path is an SCG (Secondary Cell Group) bearer, the third communication path is a Split bearer, an MCG Split bearer, or a Split LWA bearer;

the fourth communication path is a Switched LWA bearer, and the fifth communication path is an SCG Split bearer.

(Supplementary Note 5)

The communication system according to any one of notes 1 to 4, wherein the characteristic of the service are characteristics per radio terminal, bearer, or flow.

(Supplementary Note 6)

The communication system according to any one of notes 1 to 5, wherein the characteristic of the backhaul are at least one backhaul domain type and an available band, a delay time, and a reliability associated with said at least one backhaul domain type.

(Supplementary Note 7)

The communication system according to any one of notes 1 to 6;

wherein the first radio access apparatus, the second radio access apparatus, and the radio terminal support LTE-NG Tight Interworking;

wherein the communication system includes means for generating a network slice(s) corresponding to the service provided to the radio terminal and a means that determines the communication path type also in view of the generated network slice(s).

(Supplementary Note 8)

A first radio access apparatus, which supports a plurality of types of communication paths which go through at least one of the first radio access apparatus and a second radio access apparatus and which communicates with a radio terminal that is enabled to simultaneously communicate with the first radio access apparatus and the second radio access apparatus, the first radio access apparatus including:

a means that acquires service characteristic information that indicates a characteristic of a service provided to the radio terminal; and a means that determines a type of a communication path for downlink user data used for provision of the service to the radio terminal from among the plurality types of communication paths, based on the service characteristic information;

wherein the plurality of types of communication paths includes at least two out of:

a first communication path that goes through only the first radio access apparatus;

a second communication path that goes through only the second radio access apparatus;

a third communication path in which a part of traffic of downlink user data that has arrived at the first radio access apparatus goes through the second radio access apparatus and a remaining part of the traffic goes through the first radio access apparatus;

a fourth communication path in which traffic of downlink user data that has arrived at the first radio access apparatus goes through only the second radio access apparatus;

a fifth communication path in which a part of traffic of downlink user data that has arrived at the second radio access apparatus goes through the first radio access apparatus and a remaining part of the traffic goes through the second radio access apparatus; and a sixth communication path in which traffic of downlink user data that has arrived at the second radio access apparatus goes through only the first radio access apparatus.

(Supplementary Note 9)

A radio terminal, configured to be able to simultaneously communicate with a first radio access apparatus and a second radio access apparatus, the radio terminal including:

a means that receives control information including a determined type of a communication path type from the first radio access apparatus or the second radio access apparatus that has determined a type of a communication path for downlink user data used for provision of a service to the radio terminal from among a plurality of types of communication paths which go through at least one of the first radio access apparatus and the second radio access apparatus, based on service characteristic information that indicates a characteristic of the service provided to the radio terminal; and a means that receives the downlink user data from at least one of the first radio access apparatus and the second radio access apparatus via a communication path corresponding to the type of communication path included in the control information;

wherein the plurality of types of communication paths includes at least two out of:

a first communication path that goes through only the first radio access apparatus;

a second communication path that goes through only the second radio access apparatus;

a third communication path in which a part of traffic of downlink user data that has arrived at the first radio access apparatus goes through the second radio access apparatus and a remaining part of the traffic goes through the first radio access apparatus;

a fourth communication path in which traffic of downlink user data that has arrived at the first radio access apparatus goes through only the second radio access apparatus;

a fifth communication path in which a part of traffic of downlink user data that has arrived at the second radio access apparatus goes through the first radio access apparatus and a remaining part of the traffic goes through the second radio access apparatus; and a sixth communication path in which traffic of downlink user data that has arrived at the second radio access apparatus goes through only the first radio access apparatus.

(Supplementary Note 10)

A control method of a first radio access apparatus, which supports a plurality of types of communication paths which go through at least one of the first radio access apparatus and a second radio access apparatus and which communicates with a radio terminal that is enabled to simultaneously communicate with the first radio access apparatus and the second radio access apparatus, the control method comprising:

acquiring service characteristic information that indicates a characteristic of a service provided to the radio terminal; and determining a type of a communication path for downlink user data used for provision of the service to the radio terminal from among the plurality types of communication paths, based on the service characteristic information;

wherein the plurality of types of communication paths includes at least two out of:

a first communication path that goes through only the first radio access apparatus;

a second communication path that goes through only the second radio access apparatus;

a third communication path in which a part of traffic of downlink user data that has arrived at the first radio access apparatus goes through the second radio access apparatus and a remaining part of the traffic goes through the first radio access apparatus;

a fourth communication path in which traffic of downlink user data that has arrived at the first radio access apparatus goes through only the second radio access apparatus;

a fifth communication path in which a part of traffic of downlink user data that has arrived at the second radio access apparatus goes through the first radio access apparatus and a remaining part of the traffic goes through the second radio access apparatus; and a sixth communication path in which traffic of downlink user data that has arrived at the second radio access apparatus goes through only the first radio access apparatus.

(Supplementary Note 11)

A control method of a radio terminal, configured to be able to simultaneously communicate with a first radio access apparatus and a second radio access apparatus, the control method comprising:

receiving control information including a determined type of a communication path type from the first radio access apparatus or the second radio access apparatus that has determined a type of a communication path for downlink user data used for provision of a service to the radio terminal from among a plurality of types of communication paths which go through at least one of the first radio access apparatus and the second radio access apparatus, based on service characteristic information that indicates a characteristic of the service provided to the radio terminal; and receiving the downlink user data from at least one of the first radio access apparatus and the second radio access apparatus via a communication path corresponding to the type of communication path included in the control information;

wherein the plurality of types of communication paths includes at least two out of:

a first communication path that goes through only the first radio access apparatus;

a second communication path that goes through only the second radio access apparatus;

a third communication path in which a part of traffic of downlink user data that has arrived at the first radio access apparatus goes through the second radio access apparatus and a remaining part of the traffic goes through the first radio access apparatus;

a fourth communication path in which traffic of downlink user data that has arrived at the first radio access apparatus goes through only the second radio access apparatus;

a fifth communication path in which a part of traffic of downlink user data that has arrived at the second radio access apparatus goes through the first radio access apparatus and a remaining part of the traffic goes through the second radio access apparatus; and a sixth communication path in which traffic of downlink user data that has arrived at the second radio access apparatus goes through only the first radio access apparatus.

(Supplementary Note 12)

A control node, which can communicate with, in a communication system which includes a first radio access apparatus, a second radio access apparatus, and a radio terminal that is enabled to simultaneously communicate with the first radio access apparatus and the second radio access apparatus and in which user data can be transmitted to the radio terminal by using one of a plurality of types of communication paths which go through at least one of the first radio access apparatus and the second radio access apparatus, the first radio access apparatus or the second radio access apparatus, the control node comprising:

a means that receives a message for requesting service characteristic information and backhaul characteristic information used for determination of one of the communication path types from the first radio access apparatus or the second radio access apparatus; and means for transmitting the service characteristic information and the backhaul characteristic information to the first radio access apparatus or the second radio access apparatus that has transmitted the request message;

wherein the first radio access apparatus or the second radio access apparatus determines a type of a communication path for downlink user data used for provision of a service to the radio terminal from among the plurality types of communication paths, based on the service characteristic information and the backhaul characteristic information; and wherein the plurality of types of communication paths includes at least two out of:

a first communication path that goes through only the first radio access apparatus;

a second communication path that goes through only the second radio access apparatus;

a third communication path in which a part of traffic of downlink user data that has arrived at the first radio access apparatus goes through the second radio access apparatus and a remaining part of the traffic goes through the first radio access apparatus;

a fourth communication path in which traffic of downlink user data that has arrived at the first radio access apparatus goes through only the second radio access apparatus;

a fifth communication path in which a part of traffic of downlink user data that has arrived at the second radio access apparatus goes through the first radio access apparatus and a remaining part of the traffic goes through the second radio access apparatus; and a sixth communication path in which traffic of downlink user data that has arrived at the second radio access apparatus goes through only the first radio access apparatus.

What is claimed is:

1. A master node for dual connectivity using Long Term Evolution (LTE) and New Radio (NR), the master node comprising:
an Xn interface connected with a secondary node; and
a processor configured to:
send, to the secondary node, a secondary node addition request message that includes first information for a master node terminated bearer or second information for a secondary node terminated bearer, wherein
the first information for the master node terminated bearer or the second information for the secondary node terminated bearer in the secondary node addition request message is configured based on a network slice provided for a User Equipment (UE) that supports the dual connectivity, and wherein
A) the master node terminated bearer provides a first user plane connection to a core network entity, wherein the master node terminated bearer is:
a first bearer whose transport of user plane data for the UE involves a Master Cell Group (MCG) only;
a second bearer whose transport of user plane data for the UE involves a Secondary Cell Group (SCG) only; or
a third bearer whose transport of user plane data for the UE involves both the MCG and the SCG, and
B) the secondary node terminated bearer provides a second user plane connection to the core network entity, wherein the secondary node terminated bearer is:
a fourth bearer whose transport of user plane data for the UE involves the MCG only;
a fifth bearer whose transport of user plane data for the UE involves the SCG only; or
a sixth bearer whose transport of user plane data for the UE involves both the MCG and the SCG.

2. The master node of claim 1, wherein the network slice indicates a network slice instance identifier.

3. The master node of claim 1, wherein the network slice indicates network name information.

4. The master node of claim 1, wherein the network slice indicates network information.

5. The master node of claim 1, wherein the master node is configured to support at least the first bearer and the third bearer.

6. A communication method of a master node for dual connectivity using Long Term Evolution (LTE) and New Radio (NR), wherein the master node comprises an Xn interface connected with a secondary node, the method comprising:
sending, to the secondary node, a secondary node addition request message that includes first information for a master node terminated bearer or second information for a secondary node terminated bearer, wherein
the first information for the master node terminated bearer or the second information for the secondary node terminated bearer in the secondary node addition request message is configured based on a network slice provided for a User Equipment (UE) that supports the dual connectivity, and wherein
A) the master node terminated bearer provides a first user plane connection to a core network entity and is terminated in the master node, wherein the master node terminated bearer is:
a first bearer whose transport of user plane data for the UE involves a Master Cell Group (MCG) only;
a second bearer whose transport of user plane data for the UE involves a Secondary Cell Group (SCG) only; or a third bearer whose transport of user plane data for the UE involves both the MCG and the SCG, and B) the secondary node terminated bearer provides a second user plane connection to the core network entity and is terminated in the secondary node, wherein the secondary node terminated bearer is:

a fourth bearer whose transport of user plane data for the UE involves the MCG only;

a fifth bearer whose transport of user plane data for the UE involves the SCG only; or a sixth bearer whose transport of user plane data for the UE involves both the MCG and the SCG.

7. The communication method of claim 6, wherein the network slice indicates a network slice instance identifier.

8. The communication method of claim 6, wherein the network slice indicates network name information.

9. The communication method of claim 6, wherein the network slice indicates network information.

10. A communication method of a User Equipment (UE) performing a dual connectivity, the communication method comprising:

communicating with a master node for the dual connectivity using Long Term Evolution (LTE) and New Radio (NR); and communicating with a secondary node for the dual connectivity, wherein a secondary node addition request message is sent from the master node to the secondary node, the secondary node addition request message including first information for a master node terminated bearer or second information for a secondary node terminated bearer, wherein the first information for the master node terminated bearer or the second information for the secondary node terminated bearer in the secondary node addition request message is configured based on a network slice provided for the UE that supports the dual connectivity, and wherein A) the master node terminated bearer provides a first user plane connection to a core network entity and is terminated in the master node, wherein the master node terminated bearer is:

a first bearer whose transport of user plane data for the UE involves a Master Cell Group (MCG) only;

a second bearer whose transport of user plane data for the UE involves a Secondary Cell Group (SCG) only; or a third bearer whose transport of user plane data for the UE involves both the MCG and the SCG, and B) the secondary node terminated bearer provides a second user plane connection to the core network entity and is terminated in the secondary node, wherein the secondary node terminated bearer is:

a fourth bearer whose transport of user plane data for the UE involves the MCG only;

a fifth bearer whose transport of user plane data for the UE involves the SCG only; or a sixth bearer whose transport of user plane data for the UE involves both the MCG and the SCG.

* * * * *